(12) United States Patent
Matsui et al.

(10) Patent No.: US 9,783,715 B2
(45) Date of Patent: Oct. 10, 2017

(54) CURABLE COMPOSITION, CURED PRODUCT, METHOD FOR USING CURABLE COMPOSITION, PHOTOELEMENT SEALING BODY AND METHOD FOR PRODUCING PHOTOELEMENT SEALING BODY

(71) Applicant: LINTEC CORPORATION, Tokyo (JP)

(72) Inventors: Masami Matsui, Tokyo (JP); Mikihiro Kashio, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 0 days.

(21) Appl. No.: 14/771,020

(22) PCT Filed: Feb. 27, 2014

(86) PCT No.: PCT/JP2014/054951
§ 371 (c)(1),
(2) Date: Aug. 27, 2015

(87) PCT Pub. No.: WO2014/133103
PCT Pub. Date: Sep. 4, 2014

(65) Prior Publication Data
US 2016/0009970 A1 Jan. 14, 2016

(30) Foreign Application Priority Data
Feb. 28, 2013 (JP) ................................. 2013-039159

(51) Int. Cl.
| | | |
|---|---|---|
| *C08L 83/08* | (2006.01) | |
| *C09J 183/06* | (2006.01) | |
| *C08K 5/5435* | (2006.01) | |
| *C08K 5/544* | (2006.01) | |
| *C09D 183/06* | (2006.01) | |
| *C08L 83/06* | (2006.01) | |
| *C08L 83/04* | (2006.01) | |
| *C08G 77/14* | (2006.01) | |

(Continued)

(52) U.S. Cl.
CPC ............. *C09J 183/06* (2013.01); *C08K 5/544* (2013.01); *C08K 5/5435* (2013.01); *C09D 183/06* (2013.01); *C08G 77/14* (2013.01); *C08G 77/24* (2013.01); *C08G 77/26* (2013.01); *C08L 83/04* (2013.01); *C08L 83/06* (2013.01); *C08L 83/08* (2013.01); *Y02E 10/50* (2013.01)

(58) Field of Classification Search
CPC .................... C08L 83/04; C08L 83/06
See application file for complete search history.

(56) References Cited

U.S. PATENT DOCUMENTS

| 5,717,009 A | 2/1998 | Matsushita et al. |
|---|---|---|
| 7,994,261 B2 * | 8/2011 | Beers ............... C08L 75/04 106/287.16 |

(Continued)

FOREIGN PATENT DOCUMENTS

| JP | 7-309927 A | 11/1995 |
|---|---|---|
| JP | 2000-044583 A | 2/2000 |

(Continued)

OTHER PUBLICATIONS

International Search Report issued in PCT/JP2014/054951, mailed on Mar. 25, 2014.

(Continued)

*Primary Examiner* — Margaret Moore
(74) *Attorney, Agent, or Firm* — Birch, Stewart, Kolasch & Birch, LLP

(57) ABSTRACT

The present invention relates to: a curable composition comprising a component (A), a component (B), and a component (C), the curable composition comprising the component (A) and the component (B) in a mass ratio (component (A):component (B)) of 100:0.3 to 100:30, a cured product obtained by curing the curable composition, a method for using the curable composition as an optical device-securing adhesive or an optical device sealing material. The present invention provides a curable composition that produces a cured product that exhibits excellent transparency, excellent heat resistance, excellent crack resistance, and high adhesion, a cured product obtained by curing the curable composition, a method for using the curable composition as an optical device-securing adhesive or an optical device sealing material, a sealed optical device in which an optical device is sealed with a cured product of the curable composition, and a method for producing the same. Component (A): a silane compound copolymer (I) that is represented by a formula (a-1), wherein $R^1$ is a hydrogen atom or the like, $X^0$ is a halogen atom, a cyano group, or a group represented by OG (wherein G is a protecting group for a hydroxyl group), D is a single bond or the like, $R^2$ is an alkyl group having 1-20 carbon atoms or the like, Z is a hydroxyl group, an alkoxy group having 1-10 carbon atoms, or a halogen atom, m and n are a positive integer, and o, p, q, and r are 0 or a positive integer, Component (B): at least one silane coupling agent selected from a silane coupling agent that includes a nitrogen atom in its molecule and a silane coupling agent that includes an epoxy group in its molecule, and Component (C): a silane coupling agent that has an acid anhydride structure.

$(CHR^1X^0\text{-}D\text{-}SiO_{3/2})_m(R^2SiO_{3/2})_n(CHR^1X^0\text{-}D\text{-}SiZO_{2/2})_o(R^2SiZO_{2/2})_p(CHR^1X^0\text{-}D\text{-}SiZ_2O_{1/2})_q(R^2SiZ_2O_{1/2})_r$ (a-1)

22 Claims, No Drawings

(51) Int. Cl.
    *C08G 77/24* (2006.01)
    *C08G 77/26* (2006.01)

(56) References Cited

U.S. PATENT DOCUMENTS

| | | | |
|---|---|---|---|
| 8,703,880 B2* | 4/2014 | Kashio | C08G 77/04 438/781 |
| 2003/0134951 A1* | 7/2003 | Yamaya | C08J 7/047 524/265 |
| 2005/0227092 A1* | 10/2005 | Yamaya | C09D 5/1625 428/447 |
| 2011/0124812 A1 | 5/2011 | Tamada et al. | |

FOREIGN PATENT DOCUMENTS

| | | | |
|---|---|---|---|
| JP | 2001-247749 A | | 9/2001 |
| JP | 2004-359933 A | | 12/2004 |
| JP | 2005-263869 A | | 9/2005 |
| JP | 2006-249327 A | | 9/2006 |
| JP | 2006-328231 A | | 12/2006 |
| JP | 2009-001752 A | | 1/2009 |
| JP | 2012-197425 A | | 10/2012 |
| TW | 200704716 A | | 2/2007 |
| WO | 2011/111673 | * | 9/2011 |
| WO | WO 2012/073988 A1 | | 6/2012 |

OTHER PUBLICATIONS

Written Opinion issued in PCT/JP2014/054951 dated Mar. 25, 2014.
Chinese Office Action issued Nov. 28, 2016, for Chinese Application No. 201480023527.4, with an English translation of the Chinese Office Action.
Taiwanese Office Action and Search Report, dated Apr. 19, 2017, for corresponding Taiwanese Application No. 103106969, as well as an English translation.

* cited by examiner

CURABLE COMPOSITION, CURED PRODUCT, METHOD FOR USING CURABLE COMPOSITION, PHOTOELEMENT SEALING BODY AND METHOD FOR PRODUCING PHOTOELEMENT SEALING BODY

TECHNICAL FIELD

The present invention relates to a curable composition that produces a cured product that exhibits excellent transparency, excellent heat resistance, excellent crack resistance, and high adhesion, a cured product of the curable composition, a method for using the curable composition as an optical device-securing adhesive or an optical device sealing material, a sealed optical device in which an optical device is sealed with a cured product of the curable composition, and a method for producing the same.

BACKGROUND ART

A curable composition has been improved in variously ways corresponding to the application, and has been widely used as a raw material for producing an optical part or a formed article, an adhesive, a coating material, and the like. For example, a curable composition that produces a cured product that exhibits excellent transparency is preferable as an optical part raw material or a coating material, and a curable composition that produces a cured product that exhibits high adhesion is preferable as an adhesive or a coating material.

In recent years, a curable composition has also been used as an optical device-securing composition (e.g., optical device-securing adhesive or optical device sealing material).

Examples of the optical device include a light-emitting device (e.g., laser (e.g., semiconductor laser diode (LD)) and light-emitting diode (LED)), a light-receiving device, a hybrid optical device, an optical integrated circuit, and the like. In recent years, an optical device that emits blue light or white light (i.e., has a shorter emission peak wavelength) has been developed, and widely used. There is a tendency in which the brightness of a light-emitting device having a short emission peak wavelength is significantly increased, and the amount of heat generated by such an optical device further increases.

Along with a recent increase in brightness of an optical device, a cured product of an optical device-securing composition may deteriorate due to exposure to high-energy light or high-temperature heat generated by the optical device, whereby cracking or delamination may occur.

Patent Documents 1 to 3 propose an optical device-securing composition that includes a polysilsesquioxane compound as the main component in order to solve the above problem.

A cured product obtained by curing the optical device-securing composition disclosed in Patent Documents 1 to 3 that includes a polysilsesquioxane compound as the main component may exhibit sufficient adhesion, but may exhibit insufficient heat resistance and insufficient transparency.

Patent Documents 4 and 5 respectively propose an epoxy resin composition that includes an alicyclic epoxy resin and an epoxy resin composition that includes a polythiol compound as an optical device sealing composition.

However, these compositions may show a deterioration in light resistance or adhesion with the passage of time.

Therefore, development of a curable composition that produces a cured product that exhibits better heat resistance and transparency, and also exhibits high adhesion has been desired.

RELATED-ART DOCUMENT

Patent Document

Patent Document 1: JP-A-2004-359933
Patent Document 2: JP-A-2005-263869
Patent Document 3: JP-A-2006-328231
Patent Document 4: JP-A-7-309927
Patent Document 5: JP-A-2009-001752

SUMMARY OF THE INVENTION

Technical Problem

The invention was conceived in view of the above situation. An object of the invention is to provide a curable composition that produces a cured product that exhibits excellent transparency, excellent heat resistance, excellent crack resistance, and high adhesion, a cured product obtained by curing the curable composition, a method for using the curable composition as an optical device-securing adhesive or an optical device sealing material, a sealed optical device in which an optical device is sealed with a cured product of the curable composition, and a method for producing the same.

Solution to Problem

The inventors of the invention conducted extensive studies in order to solve the above problem. As a result, the inventors found that a cured product of a curable composition that includes (A) a silane compound copolymer represented by the following formula (a-1), (B) at least one silane coupling agent selected from a silane coupling agent that includes a nitrogen atom in its molecule and a silane coupling agent that includes an epoxy group in its molecule, and (C) a silane coupling agent that has an acid anhydride structure, and includes the component (A) and the component (B) in a mass ratio (component (A):component (B)) of 100:0.3 to 100:30, exhibits excellent transparency, excellent heat resistance, and excellent crack resistance for a long time, and exhibits high adhesion at a high temperature. This finding has led to the completion of the invention.

Several aspects of the invention provide the following curable composition (see (1) to (10)), cured product (see (11) and (12)), method for using a curable composition (see (13) and (14)), sealed optical device (see (15)), and method for producing a sealed optical device (see (16)).

(1) A curable composition including a component (A), a component (B), and a component (C), the curable composition including the component (A) and the component (B) in a mass ratio (component (A):component (B)) of 100:0.3 to 100:30, the component (A) being a silane compound copolymer (I) that is represented by the following formula (a-1), $$(CHR^1X^0\text{-}D\text{-}SiO_{3/2})_m(R^2SiO_{3/2})_n(CHR^1X^0\text{-}D\text{-}SiZO_{2/2})_o(R^2SiZO_{2/2})_p(CHR^1X^0\text{-}D\text{-}SiZ_2O_{1/2})_q(R^2SiZ_2O_{1/2})_r \quad \text{(a-1)}$$

wherein $R^1$ is a hydrogen atom or an alkyl group having 1 to 6 carbon atoms, $X^0$ is a halogen atom, a cyano group, or a group represented by OG (wherein G is a protecting group for a hydroxyl group), D is a single bond or a substituted or unsubstituted divalent organic group having 1 to 20 carbon atoms, $R^2$ is an alkyl group having 1 to 20 carbon atoms, or a substituted or unsubstituted phenyl group, Z is a hydroxyl group, an alkoxy group having 1 to 10 carbon atoms, or a halogen atom, m and n are independently a positive integer, and o, p, q, and r are independently 0 or a positive integer, the component (B) being at least one silane coupling agent selected from a silane coupling agent that includes a nitrogen atom in its molecule and a silane coupling agent that includes an epoxy group in its molecule, and the component (C) being a silane coupling agent that has an acid anhydride structure.

(2) The curable composition according to (1), wherein the silane compound copolymer (I) used as the component (A) has a weight average molecular weight of 800 to 30,000.

(3) The curable composition according to (1), wherein the silane compound copolymer (I) used as the component (A) is a compound represented by the formula (a-1) wherein m:n=5:95 to 60:40.

(4) The curable composition according to (1), the curable composition including the component (A) and the component (C) in a mass ratio (component (A):component (C)) of 100:0.01 to 100:30.

(5) A curable composition including a component (A'), a component (B), and a component (C), the curable composition including the component (A') and the component (B) in a mass ratio (component (A'):component (B)) of 100:0.3 to 100:30, the component (A') being a silane compound copolymer (II) that is produced by hydrolyzing and condensing a silane compound mixture that includes at least one silane compound (1) represented by the following formula (1) and at least one silane compound (2) represented by the following formula (2),

$$R^1\text{—CH}(X^0)\text{-D-Si}(OR^3)_u(X^1)_{3-u} \quad (1)$$

wherein $R^1$ is a hydrogen atom or an alkyl group having 1 to 6 carbon atoms, $X^0$ is a halogen atom, a cyano group, or a group represented by OG (wherein G is a protecting group for a hydroxyl group), D is a single bond or a substituted or unsubstituted divalent organic group having 1 to 20 carbon atoms, $R^3$ is an alkyl group having 1 to 10 carbon atoms, $X^1$ is a halogen atom, and u is an integer from 0 to 3,

$$R^2\text{Si}(OR^4)_v(X^2)_{3-v} \quad (2)$$

wherein $R^2$ is an alkyl group having 1 to 20 carbon atoms, or a substituted or unsubstituted phenyl group, $R^4$ is an alkyl group having 1 to 10 carbon atoms, $X^2$ is a halogen atom, and v is an integer from 0 to 3, the component (B) being at least one silane coupling agent selected from a silane coupling agent that includes a nitrogen atom in its molecule and a silane coupling agent that includes an epoxy group in its molecule, and the component (C) being a silane coupling agent that has an acid anhydride structure.

(6) The curable composition according to (5), wherein the silane compound copolymer (II) used as the component (A') has a weight average molecular weight of 800 to 30,000.

(7) The curable composition according to (5), the curable composition including the component (A') and the component (C) in a mass ratio (component (A'):component (C)) of 100:0.01 to 100:30.

(8) The curable composition according to (1) or (5), wherein the component (B) is a 1,3,5-N-tris[(trialkoxysilyl)alkyl]isocyanurate represented by the following formula (b-3), or an N,N'-bis[(trialkoxysilyl)alkyl]urea represented by the following formula (b-4),

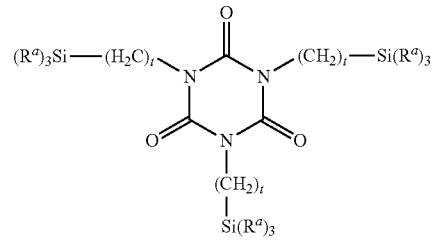

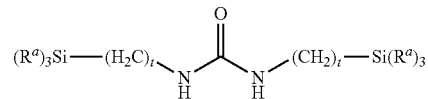

wherein $R^a$ are an alkoxy group having 1 to 6 carbon atoms, provided that $R^a$ are either identical or different, and t are independently an integer from 1 to 10.

(9) The curable composition according to (1) or (5), wherein the component (C) is a 3-(trialkoxysilyl)propylsuccinic anhydride.

(10) The curable composition according to (1) or (5), the curable composition being an optical device-securing composition.

(11) A cured product obtained by curing the curable composition according to any one of (1) to (10).

(12) The cured product according to (11), the cured product being an optical device-securing material.

(13) A method for using the curable composition according to any one of (1) to (9) as an optical device-securing adhesive.

(14) A method for using the curable composition according to any one of (1) to (9) as an optical device sealing material.

(15) A sealed optical device including an optical device, and a cured product of the curable composition according to any one of (1) to (9), the optical device being sealed with the cured product.

(16) A method for producing a sealed optical device including forming the curable composition according to any one of (1) to (9) to have the desired shape so as to enclose an optical device to obtain a formed article that includes the optical device, and curing the curable composition by heating.

Advantageous Effects of the Invention

The curable composition according to one aspect of the invention produces a cured product that does not show a deterioration in transparency due to coloration or produce cracks even when exposed to high-energy light or subjected to a high temperature, exhibits excellent transparency for a long time, and exhibits high adhesion even at a high temperature.

The curable composition according to one aspect of the invention may be used to form an optical device-securing material, and may suitably be used as an optical device-securing adhesive or an optical device sealing material.

The method for producing a sealed optical device according to one aspect of the invention can produce a sealed optical device that exhibits excellent transparency and excellent heat resistance (i.e., does not show deterioration due to coloration even when exposed to heat or light) even when the optical device is a white LED, a blue LED, or the like that has a short peak wavelength of 400 to 490 nm.

DESCRIPTION OF EMBODIMENTS

A curable composition, a cured product, a method for using a curable composition, a sealed optical device, and a method for producing a sealed optical device according to the exemplary embodiments of the invention are described in detail below.

1) Curable Composition

A curable composition according to one embodiment of the invention includes a component (A), a component (B), and a component (C), the curable composition including the component (A) and the component (B) in a mass ratio (component (A):component (B)) of 100:0.3 to 100:30, the component (A) being a silane compound copolymer (I) that is represented by the following formula (a-1),

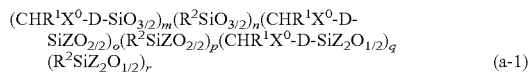

$$(CHR^1X^0\text{-}D\text{-}SiO_{3/2})_m(R^2SiO_{3/2})_n(CHR^1X^0\text{-}D\text{-}SiZO_{2/2})_o(R^2SiZO_{2/2})_p(CHR^1X^0\text{-}D\text{-}SiZ_2O_{1/2})_q(R^2SiZ_2O_{1/2})_r \quad (a\text{-}1)$$

the component (B) being at least one silane coupling agent selected from a silane coupling agent that includes a nitrogen atom in its molecule and a silane coupling agent that includes an epoxy group in its molecule, and the component (C) being a silane coupling agent that has an acid anhydride structure.

(A) Silane Compound Copolymer (I)

The component (A) included in the curable composition according to one embodiment of the invention is the silane compound copolymer (I) that is represented by the formula (a-1).

$R^1$ in the formula (a-1) is a hydrogen atom or an alkyl group having 1 to 6 carbon atoms. Examples of the alkyl group having 1 to 6 carbon atoms that may be represented by $R^1$ include a methyl group, an ethyl group, an n-propyl group, an isopropyl group, an n-butyl group, an isobutyl group, an s-butyl group, a t-butyl group, an n-pentyl group, an n-hexyl group, and the like.

$R^1$ is preferably a hydrogen atom.

$X^0$ is a halogen atom (e.g., fluorine atom, chlorine atom, bromine atom, or iodine atom), a cyano group, or a group represented by OG.

G is a protecting group for a hydroxyl group. The protecting group for a hydroxyl group is not particularly limited, and may be an arbitrary protecting group that is known as a protecting group for a hydroxyl group. Examples of the protecting group include an acyl-based protecting group; a silyl-based protecting group such as a trimethylsilyl group, a triethylsilyl group, a t-butyldimethylsilyl group, and a t-butyldiphenylsilyl group; an acetal-based protecting group such as a methoxymethyl group, a methoxyethoxymethyl group, a 1-ethoxyethyl group, a tetrahydropyran-2-yl group, and a tetrahydrofuran-2-yl group; an alkoxycarbonyl-based protecting group such as a t-butoxycarbonyl group; an ether-based protecting group such as a methyl group, an ethyl group, a t-butyl group, an octyl group, an allyl group, a triphenylmethyl group, a benzyl group, a p-methoxybenzyl group, a fluorenyl group, a trityl group, and a benzhydryl group; and the like. G is preferably an acyl-based protecting group.

The acyl-based protecting group is represented by —C(=O)$R^5$ (wherein $R^5$ is an alkyl group having 1 to 6 carbon atoms (e.g., methyl group, ethyl group, n-propyl group, isopropyl group, n-butyl group, isobutyl group, s-butyl group, t-butyl group, or n-pentyl group), or a substituted or unsubstituted phenyl group).

Examples of a substituent that may substitute the phenyl group (that is substituted or unsubstituted) that may be represented by $R^5$ include an alkyl group such as a methyl group, an ethyl group, an n-propyl group, an isopropyl group, an n-butyl group, an s-butyl group, an isobutyl group, a t-butyl group, an n-pentyl group, an n-hexyl group, an n-heptyl group, an n-octyl group, and an isooctyl group; a halogen atom such as a fluorine atom, a chlorine atom, and a bromine atom; an alkoxy group such as a methoxy group and an ethoxy group; and the like.

$X^0$ is preferably a chlorine atom or a group selected from a group represented by OG' (wherein G' is an acyl-based protecting group) and a cyano group, more preferably a chlorine atom or a group selected from an acetoxy group and a cyano group, and particularly preferably a cyano group, from the viewpoint of availability and a capability to produce a cured product that exhibits high adhesion.

D is a single bond or a substituted or unsubstituted divalent organic group having 1 to 20 carbon atoms.

Examples of the divalent organic group having 1 to 20 carbon atoms include an alkylene group having 1 to 20 carbon atoms, an alkenylene group having 2 to 20 carbon atoms, an alkynylene group having 2 to 20 carbon atoms, an arylene group having 6 to 20 carbon atoms, a divalent group having 7 to 20 carbon atoms obtained by combining an alkylene group, an alkenylene group, or an alkynylene group with an arylene group, and the like.

Examples of the alkylene group having 1 to 20 carbon atoms include a methylene group, an ethylene group, a propylene group, a trimethylene group, a tetramethylene group, a pentamethylene group, a hexamethylene group, and the like.

Examples of the alkenylene group having 2 to 20 carbon atoms include a vinylene group, a propenylene group, a butenylene group, a pentenylene group, and the like.

Examples of the alkynylene group having 2 to 20 carbon atoms include an ethynylene group, a propynylene group, and the like.

Examples of the arylene group having 6 to 20 carbon atoms include an o-phenylene group, an m-phenylene group, a p-phenylene group, a 2,6-naphthylene group, and the like.

Examples of a substituent that may substitute the alkylene group having 1 to 20 carbon atoms, the alkenylene group having 2 to 20 carbon atoms, and the alkynylene group having 2 to 20 carbon atoms include a halogen atom such as a fluorine atom and a chlorine atom; an alkoxy group such as a methoxy group and an ethoxy group; an alkylthio group such as a methylthio group and an ethylthio group; an alkoxycarbonyl group such as a methoxycarbonyl group and an ethoxycarbonyl group; and the like.

Examples of a substituent that may substitute the arylene group having 6 to 20 carbon atoms include a cyano group; a nitro group; a halogen atom such as a fluorine atom, a chlorine atom, and a bromine atom; an alkyl group such as a methyl group and an ethyl group; an alkoxy group such as a methoxy group and an ethoxy group; an alkylthio group such as a methylthio group and an ethylthio group; and the like.

These substituents may be bonded to the alkylene group, the alkenylene group, the alkynylene group, and the arylene group at an arbitrary position. A plurality of identical or different substituents may be bonded to the alkylene group, the alkenylene group, the alkynylene group, and the arylene group.

Examples of the divalent group obtained by combining a substituted or unsubstituted alkylene group, a substituted or unsubstituted alkenylene group, or a substituted or unsubstituted alkynylene group with a substituted or unsubstituted arylene group include a group in which at least one group among a substituted or unsubstituted alkylene group, a substituted or unsubstituted alkenylene group, and a substituted or unsubstituted alkynylene group is linearly bonded to at least one substituted or unsubstituted arylene group, and the like. Specific examples of the divalent group include the groups respectively represented by the following formulas, and the like.

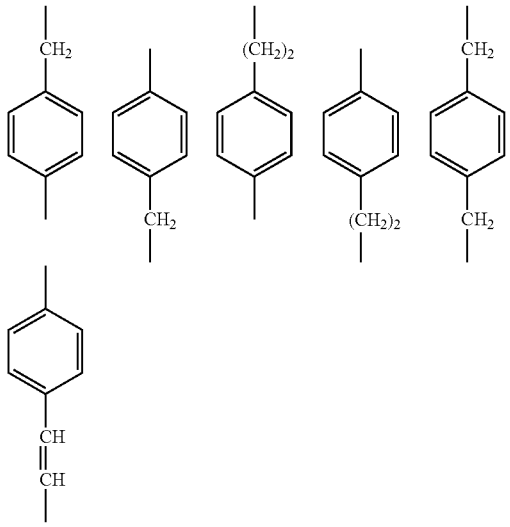

D is preferably an alkylene group having 1 to 10 carbon atoms, more preferably an alkylene group having 1 to 6 carbon atoms, and particularly preferably a methylene group or an ethylene group, since a cured product that exhibits high adhesion can be obtained.

$R^2$ is an alkyl group having 1 to 20 carbon atoms, or a substituted or unsubstituted phenyl group.

Examples of the alkyl group having 1 to 20 carbon atoms that may be represented by $R^2$ include a methyl group, an ethyl group, an n-propyl group, an isopropyl group, an n-butyl group, an s-butyl group, an isobutyl group, a t-butyl group, an n-pentyl group, an n-hexyl group, an n-octyl group, an isooctyl group, an n-nonyl group, an n-decyl group, an n-dodecyl group, and the like.

Examples of a substituent that may substitute the phenyl group (that is substituted or unsubstituted) that may be represented by $R^2$ include an alkyl group such as a methyl group, an ethyl group, an n-propyl group, an isopropyl group, an n-butyl group, an s-butyl group, an isobutyl group, a t-butyl group, an n-pentyl group, an n-hexyl group, an n-heptyl group, an n-octyl group, and an isooctyl group; an alkoxy group such as a methoxy group and an ethoxy group; a halogen atom such as a fluorine atom and a chlorine atom; and the like.

Specific examples of the substituted or unsubstituted phenyl group that may be represented by $R^2$ include a phenyl group, a 2-chlorophenyl group, a 4-methylphenyl group, a 3-ethylphenyl group, a 2,4-dimethylphenyl group, a 2-methoxyphenyl group, and the like.

Z is a hydroxyl group, an alkoxy group having 1 to 10 carbon atoms, or a halogen atom. Examples of the alkoxy group having 1 to 10 carbon atoms include a methoxy group, an ethoxy group, a propoxy group, an isopropoxy group, a butoxy group, a t-butoxy group, a pentyloxy group, a hexyloxy group, an octyloxy group, and the like. Examples of the halogen atom include a fluorine atom, a chlorine atom, a bromine atom, and the like.

m and n are independently a positive integer. It is preferable that m and n be positive integers that satisfy m:n=5:95 to 60:40, and particularly preferably positive integers that satisfy m:n=10:90 to 40:60, since the advantageous effects of the invention can be more easily achieved.

o, p, q, and r are independently 0 or a positive integer.

The silane compound copolymer (I) may be a random copolymer, a block copolymer, a graft copolymer, an alternating copolymer, or the like. The silane compound copolymer (I) may have a ladder structure, a double decker structure, a basket structure, a partially cleaved basket structure, a cyclic structure, or a random structure.

The weight average molecular weight (Mw) of the silane compound copolymer (I) is preferably 800 to 30,000, more preferably 1,200 to 6,000, and still more preferably 1,500 to 2,000. When the weight average molecular weight (Mw) of the silane compound copolymer (I) is within the above range, the resulting composition exhibits an excellent handling capability, and produces a cured product that exhibits excellent adhesion and excellent heat resistance. The weight average molecular weight (Mw) of the silane compound copolymer (I) may be determined as a standard polystyrene-equivalent value by gel permeation chromatography (GPC) using tetrahydrofuran (THF) as a solvent (hereinafter the same), for example.

The molecular weight distribution (Mw/Mn) of the silane compound copolymer (I) is not particularly limited, but is normally 1.0 to 3.0, and preferably 1.1 to 2.0. When the molecular weight distribution (Mw/Mn) of the silane compound copolymer (I) is within the above range, a cured product that exhibits excellent adhesion and excellent heat resistance can be obtained.

Note that only one type of the silane compound copolymer (I) may be used, or two or more types of the silane compound copolymer (I) may be used in combination.

The silane compound copolymer (I) (i.e., component (A)) may be produced using an arbitrary method. It is preferable to produce the silane compound copolymer (I) by condensing the silane compound (1) and the silane compound (2) as described later in connection with the silane compound copolymer (II).

When producing the silane compound copolymer (I) (i.e., component (A)) by condensing (reacting) the silane compound (1) and the silane compound (2) as described later in connection with the silane compound copolymer (II), $OR^3$ or $X^1$ included in the silane compound (1) remains in the silane compound copolymer (I) when $OR^3$ or $X^1$ is not subjected to dehydration and dealcoholization condensation. When one $OR^3$ or $X^1$ is not subjected to condensation, the one $OR^3$ or $X^1$ remains in the silane compound copolymer represented by the formula (a-1) as $(CHR^1X^0\text{-D-}SiZO_{2/2})$. When two $OR^3$ or $X^1$ are not subjected to condensation, the two $OR^3$ or $X^1$ remain in the silane compound copolymer represented by the formula (a-1) as $(CHR^1X^0\text{-D-}SiZ_2O_{1/2})$.

$OR^4$ or $X^2$ included in the silane compound (2) remains in the silane compound copolymer (I) when $OR^4$ or $X^2$ is not subjected to dehydration and dealcoholization condensation. When one $OR^4$ or $X^2$ is not subjected to condensation, the one $OR^4$ or $X^2$ remains in the silane compound copolymer represented by the formula (a-1) as $(R^2SiZO_{2/2})$. When two $OR^4$ or $X^2$ are not subjected to condensation, the two $OR^4$ or $X^2$ remain in the silane compound copolymer represented by the formula (a-1) as $(R^2SiZ_2O_{1/2})$.

The component (A) included in the curable composition according to one embodiment of the invention may be the following component (A').

Component (A'): A silane compound copolymer (II) that is produced by hydrolyzing and condensing a silane compound mixture that includes at least one silane compound (1) represented by the formula (1): $R^1$—$CH(X^0)$-D-$Si(OR^3)_u(X^1)_{3-u}$ and at least one silane compound (2) represented by the formula (2): $R^2Si(OR^4)_q(X^2)_{3-q}$.

The weight average molecular weight (Mw) of the silane compound copolymer (II) is preferably 800 to 30,000, more preferably 1,200 to 6,000, and still more preferably 1,500 to 2,000. When the weight average molecular weight (Mw) of the silane compound copolymer (II) is within the above range, the resulting composition exhibits an excellent handling capability, and produces a cured product that exhibits excellent adhesion and excellent heat resistance.

The molecular weight distribution (Mw/Mn) of the silane compound copolymer (II) is not particularly limited, but is normally 1.0 to 3.0, and preferably 1.1 to 2.0. When the molecular weight distribution (Mw/Mn) of the silane compound copolymer (II) is within the above range, a cured product that exhibits excellent adhesion and excellent heat resistance can be obtained.

Note that only one type of the silane compound copolymer (II) may be used, or two or more types of the silane compound copolymer (II) may be used in combination.

The silane compound copolymer (I) and the silane compound copolymer (II) may be either identical or different. It is preferable that the silane compound copolymer (I) and the silane compound copolymer (II) be identical.

Silane Compound (1)

The silane compound (1) is represented by the formula (1): $R^1$—$CH(X^0)$-D-$Si(OR^3)_u(X^1)_{3-u}$. A silane compound copolymer that exhibits excellent transparency and excellent adhesion even after being cured can be obtained by utilizing the silane compound (1).

$R^1$, $X^0$, and D in the formula (1) are the same as defined above. $R^3$ is an alkyl group having 1 to 10 carbon atoms, $X^1$ is a halogen atom, and u is an integer from 0 to 3.

Examples of the alkyl group having 1 to 10 carbon atoms represented by $R^3$ include a methyl group, an ethyl group, an n-propyl group, an isopropyl group, an n-butyl group, an isobutyl group, an s-butyl group, a t-butyl group, an n-pentyl group, an n-hexyl group, an n-octyl group, and the like.

Examples of the halogen atom represented by $X^1$ include a fluorine atom, a chlorine atom, a bromine atom, and the like.

When u is equal to or larger than 2, $OR^3$ are either identical or different. When (3-u) is equal to or larger than 2, $X^1$ are either identical or different.

Specific examples of the silane compound (1) include a trialkoxysilane compound in which $X^0$ is a halogen atom, such as chloromethyltrimethoxysilane,
bromomethyltriethoxysilane, 2-chloroethyltripropoxysilane,
2-bromoethyltributoxysilane, 3-chloropropyltrimethoxysilane,
3-chloropropyltriethoxysilane, 3-chloropropyltripropoxysilane,
3-chloropropyltributoxysilane, 3-bromopropyltrimethoxysilane,
3-bromopropyltriethoxysilane, 3-bromopropyltripropoxysilane,
3-bromopropyltributoxysilane, 3-fluoropropyltrimethoxysilane,
3-fluoropropyltriethoxysilane, 3-fluoropropyltripropoxysilane,
3-fluoropropyltributoxysilane, 3-iodopropyltrimethoxysilane,
2-chloroethyltrimethoxysilane, 3-chloropropyltriethoxysilane,
4-chlorobutyltripropoxysilane, 5-chloropentyltripropoxysilane,
2-chloropropyltrimethoxysilane, 3-chloro-3-acetylpropyltrimethoxysilane,
3-chloro-3-methoxycarbonylpropyltrimethoxysilane,
o-(2-chloroethyl)phenyltripropoxysilane, m-(2-chloroethyl)phenyltrimethoxysilane,
p-(2-chloroethyl)phenyltriethoxysilane, and p-(2-fluoroethyl)phenyltrimethoxysilane;
a halogenosilane compound in which $X^0$ is a halogen atom, such as
chloromethyltrichlorosilane, bromomethylbromodimethoxysilane,
2-chloroethyldichloromethoxysilane, 2-bromoethyldichloroethoxysilane,
3-chloropropyltrichlorosilane, 3-chloropropyltribromosilane,
3-chloropropyldichloromethoxysilane, 3-chloropropyldichloroethoxysilane,
3-chloropropylchlorodimethoxysilane, 3-chloropropylchlorodiethoxysilane,
3-bromopropyldichloroethoxysilane, 3-bromopropyltribromosilane,
3-bromopropyltrichlorosilane, 3-bromopropylchlorodimethoxysilane,
3-fluoropropyltrichlorosilane, 3-fluoropropylchlorodimethoxysilane,
3-fluoropropyldichloromethoxysilane, 3-fluoropropylchlorodiethoxysilane,
3-iodopropyltrichlorosilane, 4-chlorobutylchlorodiethoxysilane,
3-chloro-n-butylchlorodiethoxysilane, 3-chloro-3-acetylpropyldichloroethoxysilane, and
3-chloro-3-methoxycarbonylpropyltribromosilane;
a trialkoxysilane compound in which $X^0$ is a cyano group such as
cyanomethyltrimethoxysilane, cyanomethyltriethoxysilane,
1-cyanoethyltrimethoxysilane, 2-cyanoethyltrimethoxysilane,
2-cyanoethyltriethoxysilane, 2-cyanoethyltripropoxysilane,
3-cyanopropyltrimethoxysilane, 3-cyanopropyltriethoxysilane,
3-cyanopropyltripropoxysilane, 3-cyanopropyltributoxysilane,
4-cyanobutyltrimethoxysilane, 5-cyanopentyltrimethoxysilane,
2-cyanopropyltrimethoxysilane, 2-(cyanomethoxy)ethyltrimethoxysilane,
2-(2-cyanoethoxy)ethyltrimethoxysilane, o-(cyanomethyl)phenyltripropoxysilane,
m-(cyanomethyl)phenyltrimethoxysilane, p-(cyanomethyl)phenyltriethoxysilane, and
p-(2-cyanoethyl)phenyltrimethoxysilane;
a halogenosilane compound in which $X^0$ is a cyano group, such as
cyanomethyltrichlorosilane, cyanomethylbromodimethoxysilane,
2-cyanoethyldichloromethoxysilane, 2-cyanoethyldichloroethoxysilane,
3-cyanopropyltrichlorosilane, 3-cyanopropyltribromosilane,
3-cyanopropyldichloromethoxysilane, 3-cyanopropyldichloroethoxysilane, 3-cyanopropylchlorodimethoxysilane, 3-cyanopropylchlorodiethoxysilane,
4-cyanobutylchlorodiethoxysilane, 3-cyano-n-butylchlorodiethoxysilane,
2-(2-cyanoethoxy)ethyltrichlorosilane, 2-(2-cyanoethoxy)ethylbromodiethoxysilane,
2-(2-cyanoethoxy)ethyldichloropropoxysilane, o-(2-cyanoethyl)phenyltrichlorosilane,
m-(2-cyanoethyl)phenylmethoxydibromosilane,
p-(2-cyanoethyl)phenyldimethoxychlorosilane, and
p-(2-cyanoethyl)phenyltribromosilane;
a trialkoxysilane compound in which $X^0$ is the group represented by OG, such as
3-acetoxypropyltrimethoxysilane, 3-acetoxypropyltriethoxysilane,
3-acetoxypropyltripropoxysilane, 3-acetoxypropyltributoxysilane,
3-propionyloxypropyltrimethoxysilane, 3-propionyloxypropyltriethoxysilane,
3-benzoyloxypropyltrimethoxysilane, 3-benzoyloxypropyltriethoxysilane,
3-benzoyloxypropyltripropoxysilane, 3-benzoyloxypropyltributoxysilane,
2-trimethylsilyloxyethyltrimethoxysilane, 3-triethylsilyloxypropyltriethoxysilane,
3-(2-tetrahydropyranyloxy)propyltripropoxysilane,
3-(2-tetrahydrofuranyloxy)propyltributoxysilane,
3-methoxymethyloxypropyltrimethoxysilane,
3-methoxyethoxymethyloxypropyltriethoxysilane,
3-(1-ethoxyethyloxy)propyltripropoxysilane,
3-(t-butoxycarbonyloxy)propyltrimethoxysilane, 3-t-butoxypropyltrimethoxysilane,
3-benzyloxypropyltriethoxysilane, and 3-triphenylmethoxypropyltriethoxysilane;
a halogenosilane compound in which $X^0$ is the group represented by OG, such as
3-acetoxypropyltrichlorosilane, 3-acetoxypropyltribromosilane,
3-acetoxypropyldichloromethoxysilane, 3-acetoxypropyldichloroethoxysilane,
3-acetoxypropylchlorodimethoxysilane, 3-acetoxypropylchlorodiethoxysilane,
3-benzoyloxypropyltrichlorosilane, 3-trimethylsilyloxypropylchlorodimethoxysilane,
3-triethylsilyloxypropyldichloromethoxysilane,
3-(2-tetrahydropyranyloxy)propylchlorodiethoxysilane,
3-(2-tetrahydrofuranyloxy)propyldichloroethoxysilane,
3-methoxymethyloxypropyltribromosilane,
3-methoxyethoxymethyloxypropyltrichlorosilane,
3-(1-ethoxyethyloxy)propylchlorodimethoxysilane,
3-t-butoxycarbonyloxypropyldichloromethoxysilane,
3-t-butoxypropylchlorodiethoxysilane, 3-triphenylmethoxypropyldichloroethoxysilane,
and 3-benzyloxypropyltribromosilane; and the like.

These silane compounds (1) may be used either alone or in combination.

It is preferable that the silane compound (1) be a trialkoxysilane compound in which $X^0$ is a halogen atom, a trialkoxysilane compound in which $X^0$ is a cyano group, or a trialkoxysilane compound in which $X^0$ is the group represented by OG. It is more preferable that the silane compound (1) be a trialkoxysilane compound that includes a 3-chloropropyl group, a trialkoxysilane compound that includes a 3-acetoxypropyl group, a trialkoxysilane compound that includes a 2-cyanoethyl group, or a trialkoxysilane compound that includes a 3-cyanopropyl group. In such a case, a cured product that exhibits more excellent adhesion can be obtained.

Silane Compound (2)

The silane compound (2) is represented by the formula (2): $R^2Si(OR^4)_v(X^2)_{3-v}$.

$R^2$ in the formula (2) is the same as defined above. $R^4$ is an alkyl group having 1 to 10 carbon atoms similar to that represented by $R^3$, $X^2$ is a halogen atom similar to that represented by $X^1$, and v is an integer from 0 to 3.

When v is equal to or larger than 2, $OR^4$ are either identical or different. When (3-v) is equal to or larger than 2, $X^2$ are either identical or different.

Specific examples of the silane compound (2) include an alkyltrialkoxysilane compound such as methyltrimethoxysilane, methyltriethoxysilane,
ethyltrimethoxysilane, ethyltriethoxysilane, n-propyltrimethoxysilane,
n-butyltriethoxysilane, isobutyltrimethoxysilane, n-pentyltriethoxysilane,
n-hexyltrimethoxysilane, isooctyltriethoxysilane, dodecyltrimethoxysilane,
methyldimethoxyethoxysilane, and methyldiethoxymethoxysilane;
an alkylhalogenoalkoxysilane compound such as methylchlorodimethoxysilane,
methyldichloromethoxysilane, methyldichloromethoxysilane,
methylchlorodiethoxysilane, ethylchlorodimethoxysilane, ethyldichloromethoxysilane,
n-propylchlorodimethoxysilane, and n-propyldichloromethoxysilane;
an alkyltrihalogenosilane compound such as methyltrichlorosilane,
methyltribromosilane, ethyltrichlorosilane, ethyltribromosilane, and
n-propyltrichlorosilane;
a substituted or unsubstituted phenyltrialkoxysilane compound such as
phenyltrimethoxysilane, 4-methoxyphenyltrimethoxysilane,
2-chlorophenyltrimethoxysilane, phenyltriethoxysilane,
2-methoxyphenyltriethoxysilane, phenyldimethoxyethoxysilane, and
phenyldiethoxymethoxysilane; a substituted or unsubstituted
phenylhalogenoalkoxysilane compound such as phenylchlorodimethoxysilane,
phenyldichloromethoxysilane, phenylchloromethoxyethoxysilane,
phenylchlorodiethoxysilane, and phenyldichloroethoxysilane; and a substituted or
unsubstituted phenyltrihalogenosilane compound such as phenyltrichlorosilane,
phenyltribromosilane, 4-methoxyphenyltrichlorosilane, 2-ethoxyphenyltrichlorosilane,
and 2-chlorophenyltrichlorosilane.

These silane compounds (2) may be used either alone or in combination.

Silane Compound Mixture

The silane compound mixture that is used to produce the silane compound copolymer (II) may be a mixture of the silane compound (1) and the silane compound (2), or may further include an additional silane compound as long as the object of the invention is not impaired. It is preferable that the silane compound mixture be a mixture of the silane compound (1) and the silane compound (2).

The silane compound (1) and the silane compound (2) are preferably used in a molar ratio (silane compound (1):silane compound (2)) of 5:95 to 60:40, and more preferably 10:90 to 40:60.

When the molar ratio of the silane compound (1) to the silane compound (2) is within the above range, a cured product that exhibits excellent transparency, excellent adhesion, and excellent heat resistance can be obtained.

The silane compound mixture may be condensed using an arbitrary method. For example, the silane compound mixture may be condensed by dissolving the silane compound (1), the silane compound (2), and an optional additional silane compound in a solvent, adding a given amount of catalyst to the solution, and stirring the mixture at a given temperature.

An acid catalyst or a base catalyst may be used as the catalyst.

Examples of the acid catalyst include an inorganic acid such as hydrochloric acid, sulfuric acid, nitric acid, and phosphoric acid; an organic acid such as methanesulfonic acid, trifluoromethanesulfonic acid, benzenesulfonic acid, p-toluenesulfonic acid, acetic acid, and trifluoroacetic acid; and the like.

Examples of the base catalyst include an organic base such as trimethylamine, triethylamine, lithium diisopropylamide, lithium bis(trimethylsilyl)amide, pyridine, 1,8-diazabicyclo[5.4.0]-7-undecene, aniline, picoline, 1,4-diazabicyclo[2.2.2]octane, and imidazole; an organic base hydroxide such as tetramethylammonium hydroxide and tetraethylammonium hydroxide; a metal alkoxide such as sodium methoxide, sodium ethoxide, sodium t-butoxide, and potassium t-butoxide; a metal hydride such as sodium hydride and calcium hydride; a metal hydroxide such as sodium hydroxide, potassium hydroxide, and calcium hydroxide; a metal carbonate such as sodium carbonate, potassium carbonate, and magnesium carbonate; a metal hydrogen carbonate such as sodium hydrogen carbonate and potassium hydrogen carbonate; and the like.

The catalyst is normally used in a ratio of 0.1 to 10 mol %, and preferably 1 to 5 mol %, based on the total number of moles of the silane compounds.

The solvent may be appropriately selected taking account of the type of each silane compound and the like. Examples of the solvent include water; an aromatic hydrocarbon such as benzene, toluene, and xylene; an ester such as methyl acetate, ethyl acetate, propyl acetate, and methyl propionate; a ketone such as acetone, methyl ethyl ketone, methyl isobutyl ketone, and cyclohexanone; an alcohol such as methyl alcohol, ethyl alcohol, n-propyl alcohol, isopropyl alcohol, n-butyl alcohol, isobutyl alcohol, s-butyl alcohol, and t-butyl alcohol; and the like. These solvents may be used either alone or in combination.

The solvent is normally used so that the total number of moles of the silane compounds is 0.1 to 10 mol, and preferably 0.5 to 10 mol, per liter of the solvent.

The silane compounds are normally condensed (reacted) in a temperature range from 0° C. to the boiling point of the solvent (preferably 20 to 100° C.). If the reaction temperature is too low, condensation (condensation reaction) may not proceed sufficiently. If the reaction temperature is too high, it may be difficult to suppress gelation. The reaction is normally completed within 30 minutes to 20 hours.

After completion of the reaction, the mixture is neutralized by adding an aqueous solution of an alkali (e.g., sodium hydrogen carbonate) when the acid catalyst is used, or neutralized by adding an acid (e.g., hydrochloric acid) when the base catalyst is used. Salts produced during neutralization are removed by filtration, washing with water, or the like to obtain the target silane compound copolymer.

The content of the component (A) or the component (A') in the curable composition according to one embodiment of the invention is normally 50 wt % or more, preferably 60 wt % or more, more preferably 70 wt % or more, and particularly preferably 80 wt % or more. When the content of the component (A) (or the component (A')) in the curable composition according to one embodiment of the invention is within the above range, the curable composition can produce a cured product that does not show a deterioration in transparency (due to coloration) or produce cracks even when exposed to high-energy light or subjected to a high temperature, and exhibits excellent transparency and high adhesion for a long time.

Component (B) (Silane Coupling Agent)

The curable composition according to one embodiment of the invention includes at least one silane coupling agent selected from a silane coupling agent that includes a nitrogen atom in its molecule and a silane coupling agent that includes an epoxy group in its molecule as the component (B) (hereinafter may be referred to as "silane coupling agent (B)"). The curable composition according to one embodiment of the invention that includes the silane coupling agent (B) can produce a cured product that does not show a deterioration in transparency (due to coloration) or produce cracks even when exposed to high-energy light or subjected to a high temperature, and exhibits excellent transparency and high adhesion for a long time.

(B1) Silane Coupling Agent that Includes Nitrogen Atom in its Molecule

The silane coupling agent that includes a nitrogen atom in its molecule is not particularly limited. Examples of the silane coupling agent that includes a nitrogen atom in its molecule include a trialkoxysilane compound represented by the following formula (b-1), a dialkoxyalkylsilane compound or a dialkoxyarylsilane compound represented by the following formula (b-2), and the like.

$$(R^a)_3 SiR^c \qquad (b\text{-}1)$$

$$(R^a)_2(R^b)SiR^c \qquad (b\text{-}2)$$

$R^a$ is an alkoxy group having 1 to 6 carbon atoms, such as a methoxy group, an ethoxy group, an n-propoxy group, an isopropoxy group, an n-butoxy group, or a t-butoxy group.

$R^b$ is an alkyl group having 1 to 6 carbon atoms, such as a methyl group, an ethyl group, an n-propyl group, an isopropyl group, an n-butyl group, or a t-butyl group, or a substituted or unsubstituted aryl group such as a phenyl group, a 4-chlorophenyl group, or a 4-methylphenyl group.

$R^c$ is an organic group having 1 to 10 carbon atoms that includes a nitrogen atom. $R^c$ is optionally bonded to a group that includes a silicon atom.

Specific examples of the organic group having 1 to 10 carbon atoms represented by $R^c$ include an N-2-(aminoethyl)-3-aminopropyl group, a 3-aminopropyl group, an N-(1,3-dimethylbutylidene)aminopropyl group, a 3-ureidopropyltriethoxysilane group, an N-phenylaminopropyl group, and the like.

Examples of the compound represented by the formula (b-1) or (b-2) in which $R^c$ is an organic group that is bonded to a group that includes a silicon atom, include a compound in which $R^c$ is bonded to the silicon atom through an isocyanurate skeleton to form an isocyanurate-based silane coupling agent, and a compound in which $R^c$ is bonded to the silicon atom through a urea skeleton to form a urea-based silane coupling agent.

The silane coupling agent that includes a nitrogen atom in its molecule is preferably an isocyanurate-based silane coupling agent or a urea-based silane coupling agent, and more preferably an isocyanurate-based silane coupling agent or a urea-based silane coupling agent that includes four or more alkoxy groups bonded to a silicon atom in the molecule, since a cured product that exhibits higher adhesion can be obtained.

The expression "includes four or more alkoxy groups bonded to a silicon atom" used herein means that the total number of alkoxy groups bonded to an identical silicon atom and alkoxy groups bonded to different silicon atoms is equal to or larger than 4.

Examples of the isocyanurate-based silane coupling agent that includes four or more alkoxy groups bonded to a silicon atom include a 1,3,5-N-tris[(trialkoxysilyl)alkyl]isocyanurate represented by the following formula (b-3). Examples of the urea-based silane coupling agent that includes four or more alkoxy groups bonded to a silicon atom include an N,N'-bis[(trialkoxysilyl)alkyl]urea represented by the following formula (b-4).

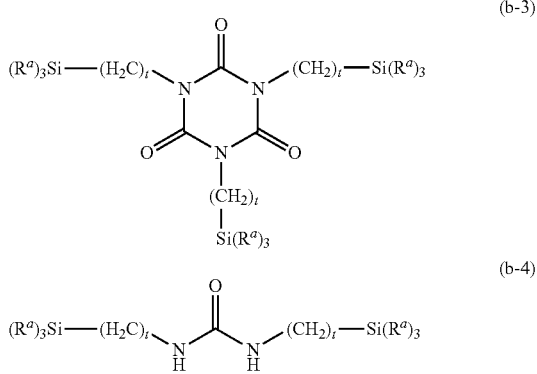

$R^a$ is the same as defined above, provided that $R^a$ are either identical or different.

t are independently an integer from 1 to 10, preferably an integer from 1 to 6, and particularly preferably 3.

The groups represented by —$(CH_2)_t$—$Si(R^a)_3$ that are bonded to each nitrogen atom are either identical or different.

Specific examples of the compound represented by the formula (b-3) include a
1,3,5-N-tris[(tri($C_{1-6}$)alkoxy)silyl($C_{1-10}$)alkyl] isocyanurate such as
1,3,5-N-tris(3-trimethoxysilylpropyl) isocyanurate, 1,3,5-N-tris(3-triethoxysilylpropyl) isocyanurate, 1,3,5-N-tris(3-trisoipropoxysilylpropyl) isocyanurate, and
1,3,5-N-tris(3-tributoxysilylpropyl) isocyanurate;
a 1,3,5-N-tris[(di($C_{1-6}$)alkoxy)silyl($C_{1-10}$)alkyl] isocyanurate such as
1,3,5-N-tris(3-dimethoxymethylsilylpropyl) isocyanurate,
1,3,5-N-tris(3-dimethoxyethylsilylpropyl) isocyanurate,
1,3,5-N-tris(3-dimethoxyisopropylsilylpropyl) isocyanurate,
1,3,5-N-tris(3-dimethoxy-n-propylsilylpropyl) isocyanurate,
1,3,5-N-tris(3-dimethoxyphenylsilylpropyl) isocyanurate,
1,3,5-N-tris(3-diethoxymethylsilylpropyl) isocyanurate,
1,3,5-N-tris(3-diethoxyethylsilylpropyl) isocyanurate,
1,3,5-N-tris(3-diethoxyi-propylsilylpropyl) isocyanurate,
1,3,5-N-tris(3-diethoxy-n-propylsilylpropyl) isocyanurate,
1,3,5-N-tris(3-diethoxyphenylsilylpropyl) isocyanurate,
1,3,5-N-tris(3-diisopropoxymethylsilylpropyl) isocyanurate,
1,3,5-N-tris(3-diisopropoxyethylsilylpropyl) isocyanurate,
1,3,5-N-tris(3-diisopropoxyisopropylsilylpropyl) isocyanurate,
1,3,5-N-tris(3-diisopropoxy-n-propylsilylpropyl) isocyanurate,
1,3,5-N-tris(3-diisopropoxyphenylsilylpropyl) isocyanurate,
1,3,5-N-tris(3-dibutoxymethylsilylpropyl) isocyanurate,
1,3,5-N-tris(3-dibutoxyethylsilylpropyl) isocyanurate,
1,3,5-N-tris(3-dibutoxyisopropylsilylpropyl) isocyanurate,
1,3,5-N-tris(3-dibutoxy-n-propylsilylpropyl) isocyanurate, and
1,3,5-N-tris(3-dibutoxyphenylsilylpropyl) isocyanurate; and the like.

Specific examples of the compound represented by the formula (b-4) include an
N,N'-bis[(tri($C_{1-6}$)alkoxysilyl)($C_{1-10}$)alkyl]urea such as N,N'-bis(3-trimethoxysilylpropyl)urea, N,N'-bis(3-triethoxysilylpropyl)urea,
N,N'-bis(3-tripropoxysilylpropyl)urea, N,N'-bis(3-tributoxysilylpropyl)urea, and
N,N'-bis(2-trimethoxysilylethyl)urea; an
N,N'-bis[(di($C_{1-6}$)alkoxy($C_{1-6}$)alkylsilyl($C_{1-10}$)alkyl]urea such as
N,N'-bis(3-dimethoxymethylsilylpropyl)urea,
N,N'-bis(3-dimethoxyethylsilylpropyl)urea, and
N,N'-bis(3-diethoxymethylsilylpropyl)urea;
an N,N'-bis[(di($C_{1-6}$)alkoxy($C_{6-20}$)arylsilyl($C_{1-10}$)alkyl]urea such as
N,N'-bis(3-dimethoxyphenylsilylpropyl)urea and
N,N'-bis(3-diethoxyphenylsilylpropyl)urea; and the like.

These compounds may be used either alone or in combination.

It is preferable to use 1,3,5-N-tris(3-trimethoxysilylpropyl) isocyanurate, 1,3,5,-N-tris(3-triethoxysilylpropyl) isocyanurate, N,N'-bis(3-trimethoxysilylpropyl)urea, or N,N'-bis(3-triethoxysilylpropyl)urea as the component (B). It is particularly preferable to use 1,3,5-N-tris(3-trimethoxysilylpropyl) isocyanurate or 1,3,5,-N-tris(3-triethoxysilylpropyl) isocyanurate as the component (B).

(B2) Silane Coupling Agent that Includes Epoxy Group in its Molecule

The silane coupling agent that includes an epoxy group in its molecule is not particularly limited. Examples of the silane coupling agent that includes an epoxy group in its molecule include compounds respectively represented by the following formulas, and the like.

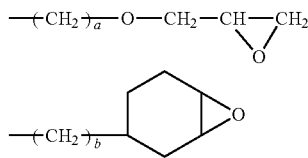

wherein a and b are independently an integer from 1 to 20, and the methylene group may be substituted with an alkyl group (e.g., methyl group or ethyl group).

Specific examples of the silane coupling agent that includes an epoxy group in its molecule include a 2-(3,4-epoxycyclohexyl)alkylsilane such as 2-(3,4-epoxycyclohexyl)ethyltrimethoxysilane and 2-(3,4-epoxycyclohexyl)ethyltriethoxysilane; a glycidyloxyalkylsilane such as 3-glycidyloxypropyl(diethoxy)methylsilane, 3-glycidyloxypropyl(dimethoxy)methylsilane, 3-glycidyloxypropyltrimethoxysilane, and 3-glycidyloxypropyltriethoxysilane; a mixture that includes two or more compounds among these compounds; and the like. A cured product that exhibits high adhesion can be obtained by utilizing these compounds.

It is preferable to use the compound represented by the formula (b-3) or (b-4) or a 2-(3,4-epoxycyclohexyl)ethyltrialkoxysilane as the component (B). It is particularly preferable to use tris[3-(trimethoxysilyl)propyl]isocyanurate, N,N'-bis(3-trimethoxysilylpropyl)urea, or 2-(3,4-epoxycyclohexyl)ethyltrimethoxysilane as the component (B), since the desired composition can be easily obtained.

The curable composition includes the component (A) (or the component (A')) and the component (B) in a mass ratio (component (A) (or component (A')):component (B)) of 100:0.3 to 100:30.

When the curable composition includes the component (A) (or the component (A')) and the component (B) in a mass ratio within the above range, it is possible to obtain a curable composition that produces a cured product that exhibits excellent transparency, excellent adhesion, excellent heat resistance, and excellent crack resistance, and rarely shows a deterioration in adhesion even when subjected to a high temperature. The mass ratio (component (A) (or component (A')):component (B)) of the component (A) (or the component (A')) to the component (B) is more preferably 100:5 to 100:20 from the above viewpoint.

(C) Silane Coupling Agent that has Acid Anhydride Structure

The curable composition according to one embodiment of the invention includes the silane coupling agent that has an acid anhydride structure (hereinafter may be referred to as "silane coupling agent (C)") as the component (C). The curable composition according to one embodiment of the invention that includes the silane coupling agent (C) does not undergo phase separation (is not clouded), and can produce a cured product that exhibits excellent transparency and high adhesion.

The silane coupling agent (C) is an organosilicon compound that includes a group (Q) having an acid anhydride structure and a hydrolyzable group ($OR^e$) in one molecule. The silane coupling agent (C) is a compound represented by the following formula (c).

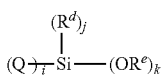

(c)

wherein Q is an acid anhydride structure, $R^d$ is an alkyl group having 1 to 6 carbon atoms, or a substituted or unsubstituted phenyl group, $R^e$ is an alkyl group having 1 to 6 carbon atoms, i is an integer from 1 to 3, j is an integer from 0 to 2, and k is an integer from 1 to 3, provided that i+j+k=4 is satisfied.

Examples of the acid anhydride structure represented by Q include the groups respectively represented by the following formulas, and the like.

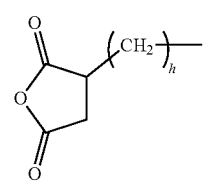

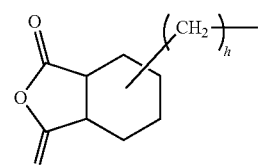

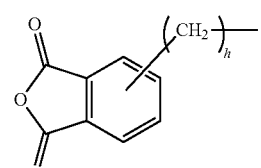

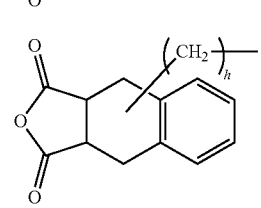

wherein h is an integer from 0 to 10. The group represented by the formula (Q1) is particularly preferable.

Examples of the alkyl group having 1 to 6 carbon atoms that may be represented by $R^d$ and $R^e$ in the formula (c) include those mentioned above in connection with $R^1$. Examples of the substituted or unsubstituted phenyl group may be represented by $R^d$ include those mentioned above in connection with $R^2$.

A compound represented by the following formula (c-1) is preferable as the compound represented by the formula (c).

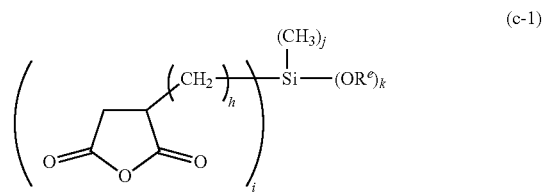

wherein $R^e$, h, i, j, and k are the same as defined above.

h is preferably 2 to 8, more preferably 2 or 3, and particularly preferably 3.

Specific examples of the silane coupling agent represented by the formula (c-1) include 2-(trimethoxysilyl)ethylsuccinic anhydride, 2-(triethoxysilyl)ethylsuccinic anhydride, 3-(trimethoxysilyl)propylsuccinic anhydride, 3-(triethoxysilyl)propylsuccinic anhydride, and the like. It is preferable to use a 3-(trialkoxysilyl)succinic anhydride such as 3-(trimethoxysilyl)propylsuccinic anhydride and 3-(triethoxysilyl)propylsuccinic anhydride.

These silane coupling agents (C) may be used either alone or in combination.

The curable composition includes the component (A) (or the component (A')) and the component (C) in a mass ratio (component (A) (or component (A')):component (C)) of 100:0.01 to 100:30, more preferably 100:0.5 to 100:20, and still more preferably 100:1 to 100:10. It is possible to more easily obtain the desired curable composition when the component (A) (or the component (A')) and the component (C) are used in a mass ratio within the above range.

The curable composition according to one embodiment of the invention may further include an additional component as long as the object of the invention is not impaired.

Examples of the additional component include a curing catalyst, an antioxidant, a UV absorber, a light stabilizer, a diluent, and the like.

The curing catalyst is added to the curable composition in order to promote curing. Examples of the curing catalyst include 2-methylimidazole, triphenylphosphine, and the like. These curing catalysts may be used either alone or in combination.

The antioxidant is added to the curable composition in order to prevent deterioration due to oxidation during heating. Examples of the antioxidant include a phosphorus-based antioxidant, a phenol-based antioxidant, a sulfur-based antioxidant, and the like.

Examples of the phosphorus-containing antioxidant include a phosphite such as triphenyl phosphite, diphenylisodecyl phosphite, phenyldiisodecyl phosphite, tris(nonylphenyl)phosphite, diisodecylpentaerythritol phosphite, tris(2,4-di-t-butylphenyl)phosphite, cyclic neopentanetetraylbis(octadecyl)phosphite, cyclic neopentanetetraylbis(2,4-di-t-butylphenyl)phosphate, cyclic neopentanetetraylbis(2,4-di-t-butyl-4-methylphenyl)phosphate, and bis[2-t-butyl-6-methyl-4-{2-(octadecyloxycarbonyl)ethyl}phenyl] hydrogen phosphate; and an oxaphosphaphenanthrene oxide such as 9,10-dihydro-9-oxa-10-phosphaphenanthrene 10-oxide, 10-(3,5-di-t-butyl-4-hydroxybenzyl)-9,10-dihydro-9-oxa-10-phosphaphenanthrene 10-oxide, and 10-desiloxy-9,10-dihydro-9-oxa-10-phosphaphenanthrene 10-oxide.

Examples of the phenol-based antioxidant include a monophenol such as
2,6-di-t-butyl-p-cresol, dibutylhydroxytoluene, butylated hydroxyanisole,
2,6-di-t-butyl-p-ethylphenol, and stearyl-β-(3,5-di-t-butyl-4-hydroxyphenyl)propionate;
a bisphenol such as 2,2'-methylenebis(4-methyl-6-t-butylphenol),
2,2'-methylenebis(4-ethyl-6-t-butylphenol), 4,4'-thiobis(3-methyl-6-t-butylphenol),
4,4'-butylidenebis(3-methyl-6-t-butylphenol), and
3,9-bis[1,1-dimethyl-2-{β-(3-t-butyl-4-hydroxy-5-methylphenyl)propionyloxy}ethyl]-2,4,8,10-tetraoxaspiro[5,5]undecane; and a polyphenol such as
1,1,3-tris(2-methyl-4-hydroxy-5-t-butylphenyl)butane,
1,3,5-trimethyl-2,4,6-tris(3,5-di-t-butyl-4-hydroxybenzyl)benzene,
tetrakis[methylene-3-(3',5'-di-t-butyl-4'-hydroxyphenyl)propionate]methane,
bis[3,3'-bis-(4'-hydroxy-3'-t-butylphenyl)butyric acid]glycol ester,
1,3,5-tris(3',5'-di-t-butyl-4'-hydroxybenzyl)-S-triazine-2,4,6-(1H,3H,5H)trione, and
tocophenol.
Examples of the sulfur-based antioxidant include dilauryl 3,3'-thiodipropionate, dimyristyl 3,3'-thiodipropionate, distearyl 3,3'-thiodipropionate, and the like.

These antioxidants may be used either alone or in combination. Since the curable composition according to one embodiment of the invention includes the component (B) and the component (D), deterioration due to oxidation during heating rarely occurs even when the antioxidant is not used. The antioxidant is normally used in an amount of 0.01 to 10 parts by mass based on 100 parts by mass of the component (A) or the component (A').

The UV absorber is added to the curable composition in order to improve the light resistance of the resulting cured product.

Examples of the UV absorber include a salicylic acid ester such as phenyl salicylate, p-t-butylphenyl salicylate, and p-octylphenyl salicylate; benzophenone and derivative thereof such as 2,4-dihydroxybenzophenone,
2-hydroxy-4-methoxybenzophenone, 2-hydroxy-4-octoxybenzophenone,
2-hydroxy-4-dodecyloxybenzophenone, 2,2'-dihydroxy-4-methoxybenzophenone,
2,2'-dihydroxy-4,4'-dimethoxybenzophenone, and
2-hydroxy-4-methoxy-5-sulfobenzophenone; benzotriazole and derivative thereof such as 2-(2'-hydroxy-5'-methylphenyl)benzotriazole,
2-(2'-hydroxy-5'-t-butylphenyl)benzotriazole,
2-(2'-hydroxy-3',5'-di-t-butylphenyl)benzotriazole,
2-(2'-hydroxy-3'-t-butyl-5'-methylphenyl)-5-chlorobenzotriazole,
2-(2'-hydroxy-3',5'-di-t-butylphenyl)-5-chlorobenzotriazole,
2-(2'-hydroxy-3',5'-di-t-amylphenyl)benzotriazole, and
2-{(2'-hydroxy-3',3'',4'',5'',6''-tetrahydrophthalimidemethyl)-5'-methylphenyl}benzotriazole; a hindered amine such as
bis(2,2,6,6-tetramethyl-4-piperidyl) sebacate, bis(1,2,2,6,6-pentamethyl-4-piperidyl) sebacate, and bis(1,2,2,6,6-pentamethyl-4-piperidyl)[{3,5-bis(1,1-dimethylethyl)-4-hydroxyphenyl}methyl]butyl malonate; and the like.

These UV absorbers may be used either alone or in combination.

The UV absorber is normally used in an amount of 0.01 to 10 parts by mass based on 100 parts by mass of the component (A) or the component (A').

The light stabilizer is added to the curable composition in order to improve the light resistance of the resulting cured product.

Examples of the light stabilizer include a hindered amine such as poly[{6-(1,1,3,3-tetramethylbutyl)amino-1,3,5-triazine-2,4-diyl}{(2,2,6,6-tetramethyl-4-piperidine) imino}hexamethylene {(2,2,6,6-tetramethyl-4-piperidine) imino}], and the like.

These light stabilizers may be used either alone or in combination.

The light stabilizer is normally used in an amount of 0.01 to 10 parts by mass based on 100 parts by mass of the component (A) or the component (A').

The diluent is added to the curable composition in order to adjust the viscosity of the curable composition.

Examples of the diluent include glycerol diglycidyl ether, butanediol diglycidyl ether, diglycidylaniline, neopentyl glycol glycidyl ether, cyclohexanedimethanol diglycidyl ether, alkylene diglycidyl ether, polyglycol diglycidyl ether, polypropylene glycol diglycidyl ether, trimethylolpropane triglycidyl ether, glycerol triglycidyl ether, 4-vinylcyclohexene monooxide, vinylcyclohexene dioxide, methylated vinylcyclohexene dioxide, and the like.

These diluents may be used either alone or in combination.

The curable composition according to one embodiment of the invention may be prepared by mixing the component (A) or the component (A'), the component (B), the component (C), and an optional additional component in a given ratio, and defoaming the mixture using a known method.

The curable composition according to one embodiment of the invention thus prepared can produce a cured product that does not show a deterioration in transparency due to coloration even when exposed to high-energy light or subjected to a high temperature, exhibits excellent transparency and excellent crack resistance for a long time, and exhibits high adhesion.

Therefore, the curable composition according to one embodiment of the invention is suitably used as a raw material for producing an optical part or a formed article, an adhesive, a coating material, and the like. Since the curable composition according to one embodiment of the invention can prevent a deterioration in an optical device-securing material due to an increase in brightness of an optical device, the curable composition may suitably be used to produce an optical device-securing composition.

2) Cured Product

A cured product according to one embodiment of the invention is obtained by curing the curable composition according to one embodiment of the invention.

The curable composition according to one embodiment of the invention may be cured by heating the curable composition. The heating temperature when curing the curable composition is normally set to 100 to 200° C., and the heating time when curing the curable composition is normally set to 10 minutes to 20 hours, and preferably 30 minutes to 10 hours.

The cured product according to one embodiment of the invention does not show a deterioration in transparency due to coloration even when exposed to high-energy light or subjected to a high temperature, exhibits excellent transparency for a long time, and exhibits high adhesion.

Therefore, the cured product according to one embodiment of the invention is suitably used as an optical part, a formed article, an adhesive layer, a coating layer, and the like. Since the cured product according to one embodiment of the invention can prevent a deterioration in an optical device-securing material due to an increase in brightness of an optical device, the cured product may suitably be used as an optical device-securing material.

The cured product according to one embodiment of the invention exhibits high adhesion when the adhesion of the cured product is measured as described below, for example. Specifically, the curable composition is applied to a mirror surface of a silicon chip. The surface of the silicon chip to which the curable composition is applied is placed on an adherend, and compression-bonded to the adherend, and the curable composition is cured by heating. After allowing the resulting product to stand for 30 seconds on a measurement stage of a bond tester that has been heated to a given temperature (e.g., 23 or 100° C.), adhesion between the specimen and the adherend is measured while applying stress to the bonding surface in the horizontal direction (shear direction) at a height of 50 μm above the adherend.

It is preferable that the cured product have an adhesion at 23° C. of 100 N/mm$^2$ or more, and more preferably 125 N/mm$^2$ or more.

Whether or not the cured product exhibits excellent transparency may be determined by measuring the light transmittance of the cured product. The light transmittance of the cured product is preferably 80% or more, and particularly preferably 84% or more at a wavelength of 400 nm. The light transmittance of the cured product is preferably 87% or more at a wavelength of 450 nm.

The cured product exhibits excellent heat resistance for a long time since the cured product shows only a small change in transparency even when subjected to a high temperature for a long time. The cured product preferably has a transmittance (wavelength: 400 nm) of 90% or more, and more preferably 95% or more of the initial transmittance when the cured product is allowed to stand at 150° C. for 500 hours.

The cured product exhibits excellent crack resistance when the cured product is subjected to the following test, for example. Specifically, the curable composition according to one embodiment of the invention is diluted with diethylene glycol monobutyl ether acetate so that the solid content in the curable composition is 80%, and applied to a mirror surface of a silicon chip (2×2 mm) to a thickness of about 2 μm. The surface of the silicon chip to which the curable composition is applied is placed on an adherend (silver-plated copper sheet), and compression-bonded to the adherend. After curing the curable composition by heating the curable composition at 170° C. for 2 hours, the width of a resin (fillet) that protrudes from the silicon chip is measured using a digital microscope. When the fillet has a width of 80 to 120 nm and is formed along each side of the silicon chip, the fillet is observed using an electron microscope (manufactured by Keyence Corporation) to determine whether or not cracks have occurred.

The crack occurrence ratio is preferably less than 35%, and more preferably less than 25%.

3) Method for Using Curable Composition

A method for using a curable composition according to one embodiment of the invention uses the curable composition according to one embodiment of the invention as an optical device-securing adhesive or an optical device sealing material.

Examples of the optical device include a light-emitting device (e.g., LED and LD), a light-receiving device, a hybrid optical device, an optical integrated circuit, and the like.

Optical Device-Securing Adhesive

The curable composition according to one embodiment of the invention may suitably be used as an optical device-securing adhesive.

When using the curable composition according to one embodiment of the invention as an optical device-securing adhesive, the curable composition according to one embodiment of the invention is applied to the bonding surface of either or both of the bonding target materials (e.g., an optical device and a substrate). After compression-bonding the bonding target materials, the curable composition is cured by heating, for example. According to this method, the bonding target materials can be firmly bonded.

Examples of a substrate material (to which an optical device is bonded) include glass such as soda lime glass and heat-resistant hard glass; a ceramic; a metal such as iron, copper, aluminum, gold, silver, platinum, chromium, titanium, alloys thereof, and stainless steel (e.g., SUS302, SUS304, SUS304L, and SUS309); a synthetic resin such as polyethylene terephthalate, polybuthylene terephthalate, polyethylene naphthalate, an ethylene-vinyl acetate copolymer, polystyrene, polycarbonate, polymethylpentene, polysulfone, polyether ether ketone, polyethersulfone, polyphenylene sulfide, polyetherimide, a polyimide, a polyamide, an acrylic resin, a norbornene-based resin, a cycloolefin resin, and a glass epoxy resin; and the like.

The heating temperature when curing the curable composition according to one embodiment of the invention is determined taking account of the composition of the curable composition and the like, but is normally 100 to 200° C. The heating time is normally 10 minutes to 20 hours, and preferably 30 minutes to 10 hours.

Optical Device Sealing Material The curable composition according to one embodiment of the invention may suitably be used as an optical device sealing material.

When using the curable composition according to one embodiment of the invention as an optical device sealing material, the curable composition according to one embodiment of the invention is formed (molded) to have the desired shape so as to enclose an optical device to obtain a formed article that includes the optical device, and cured by heating (see below), for example.

4) Sealed Optical Device and Method for Producing Sealed Optical Device

A sealed optical device according to one embodiment of the invention includes an optical device and a cured product of the curable composition according to one embodiment of the invention, the optical device being sealed with the cured product.

Since the sealed optical device according to one embodiment of the invention is produced using the curable composition according to one embodiment of the invention, the sealed optical device exhibits excellent transparency and excellent heat resistance (i.e., does not show deterioration due to coloration even when exposed to heat or light) even when the optical device is a white LED, a blue LED, or the like that has a short peak wavelength of 400 to 490 nm.

A method for producing a sealed optical device according to one embodiment of the invention includes forming the curable composition according to one embodiment of the invention to have the desired shape so as to enclose an optical device to obtain a formed article that includes the optical device, and curing the curable composition by heating.

This method can efficiently produce a sealed optical device.

The curable composition according to one embodiment of the invention may be formed to have the desired shape using an arbitrary method. A known molding method such as a transfer molding method or a casting method may be used.

The heating temperature when curing the curable composition is determined taking account of the curable composition and the like, but is normally 100 to 200° C. The heating time is normally 10 minutes to 20 hours, and preferably 30 minutes to 10 hours.

EXAMPLES

The invention is further described below by way of examples and comparative examples. Note that the invention is not limited to the following examples.

Production Example 1

A 300 ml recovery flask was charged with 20.2 g (102 mmol) of phenyltrimethoxysilane (manufactured by Tokyo Chemical Industry Co., Ltd. (hereinafter the same)), 3.15 g (18 mmol) of 2-cyanoethyltrimethoxysilane (manufactured by AZmax Co. (hereinafter the same)), 96 ml of acetone (solvent), and 24 ml of distilled water (solvent). After the addition of 0.15 g (1.5 mmol) of phosphoric acid (manufactured by Kanto Chemical Co., Inc. (hereinafter the same)) (catalyst) while stirring the mixture, the resulting mixture was stirred at room temperature (25° C.) for 16 hours.

After completion of the reaction, the reaction mixture was concentrated to 50 ml using an evaporator. After the addition of 100 ml of ethyl acetate to the concentrate, the mixture was neutralized with a saturated sodium hydrogen carbonate aqueous solution. After allowing the mixture to stand for a while, the organic layer was isolated preparatively. The organic layer was washed twice with distilled water, and dried over anhydrous magnesium sulfate. After separating magnesium sulfate by filtration, the filtrate was concentrated to 50 ml using an evaporator, and added dropwise to a large quantity of n-hexane to effect precipitation. The resulting precipitate was separated by decantation. The precipitate thus separated was dissolved in methyl ethyl ketone (MEK), and the solution was collected. The solvent was evaporated under reduced pressure using an evaporator. The residue was dried under vacuum to obtain 13.5 g of a silane compound copolymer (A1).

The weight average molecular weight (Mw) of the silane compound copolymer (A1) was 1,900.

The IR spectrum data of the silane compound copolymer (A1) is shown below. Si-Ph: 698 cm$^{-1}$, 740 cm$^{-1}$, Si—O: 1132 cm$^{-1}$, —CN: 2259 cm$^{-1}$ Production Example 2

12.9 g of a silane compound copolymer (A2) was obtained in the same manner as in Production Example 1, except that the amount of phenyltrimethoxysilane was changed to 16.6 g (84 mmol), and the amount of 2-cyanoethyltrimethoxysilane was changed to 6.30 g (36 mmol).

The weight average molecular weight (Mw) of the silane compound copolymer (A2) was 2,000.

The IR spectrum data of the silane compound copolymer (A2) is shown below. Si-Ph: 698 cm$^{-1}$, 740 cm$^{-1}$, Si—O: 1132 cm$^{-1}$, —CN: 2255 cm$^{-1}$ Production Example 3

A 300 ml recovery flask was charged with 20.2 g (102 mmol) of phenyltrimethoxysilane, 4.0 g (18 mmol) of 3-acetoxypropyltrimethoxysilane (manufactured by AZmax Co.), 60 ml of toluene (solvent), and 30 ml of distilled water (solvent). After the addition of 0.15 g (1.5 mmol) of phosphoric acid (catalyst) while stirring the mixture, the resulting mixture was stirred at room temperature (25° C.) for 16 hours.

After completion of the reaction, 100 ml of ethyl acetate was added to the reaction mixture, and the resulting mixture was neutralized with a saturated sodium hydrogen carbonate aqueous solution. After allowing the mixture to stand for a while, the organic layer was isolated preparatively. The organic layer was washed twice with distilled water, and dried over anhydrous magnesium sulfate. After separating magnesium sulfate by filtration, the filtrate was concentrated to 50 ml using an evaporator, and the concentrate was added dropwise to a large quantity of n-hexane to effect precipitation. The resulting precipitate was separated by decantation. The precipitate thus separated was dissolved in methyl ethyl ketone (MEK), and the solution was collected. The solvent was evaporated under reduced pressure using an evaporator. The residue was dried under vacuum to obtain 14.7 g of a silane compound copolymer (A3).

The weight average molecular weight (Mw) of the silane compound copolymer (A3) was 2,700.

The IR spectrum data of the silane compound copolymer (A3) is shown below. Si-Ph: 699 cm$^{-1}$, 741 cm$^{-1}$, Si—O: 1132 cm$^{-1}$, —CO: 1738 cm$^{-1}$

Production Example 4

A 300 ml recovery flask was charged with 20.2 g (102 mmol) of phenyltrimethoxysilane, 3.58 g (18 mmol) of 3-chloropropyltrimethoxysilane (manufactured by Tokyo Chemical Industry Co., Ltd.), 60 ml of toluene (solvent), and 30 ml of distilled water (solvent). After the addition of 0.15 g (1.5 mmol) of phosphoric acid (catalyst) while stirring the mixture, the resulting mixture was stirred at room temperature (25° C.) for 16 hours.

After completion of the reaction, the reaction mixture was neutralized with a saturated sodium hydrogen carbonate aqueous solution. After the addition of 100 ml of ethyl acetate, the resulting mixture was stirred, and allowed to stand, and the organic layer was isolated preparatively. The organic layer was washed twice with distilled water, and dried over anhydrous magnesium sulfate. After separating magnesium sulfate by filtration, the filtrate was added dropwise to a large quantity of n-hexane to effect precipitation. The resulting precipitate was separated by decantation. The precipitate thus separated was dissolved in methyl ethyl ketone (MEK), and the solution was collected. After evaporating the solvent under reduced pressure using an evaporator, the residue was dried under vacuum to obtain 13.6 g of a silane compound copolymer (A4).

The weight average molecular weight (Mw) of the silane compound copolymer (A4) was 3,000.

The IR spectrum data of the silane compound copolymer (A4) is shown below. Si-Ph: 700 cm$^{-1}$, 741 cm$^{-1}$, Si—O: 1132 cm$^{-1}$, —Cl: 648 cm$^{-1}$

Example 1

1 g of tris[3-(trimethoxysilyl)propyl]isocyanurate (manufactured by Shin-Etsu Chemical Co., Ltd., hereinafter referred to as "silane coupling agent (B1)") (component (B)) and 0.01 g of 3-(trimethoxysilyl)propylsuccinic anhydride ("X-12-967C" manufactured by Shin-Etsu Chemical Co., Ltd., hereinafter referred to as "silane coupling agent (C1)") (component (C)) were added to 10 g of the silane compound copolymer (A1) obtained in Production Example 1. The mixture was sufficiently mixed and defoamed to prepare a curable composition 1.

Examples 2 to 26 and Comparative Examples 1 to 13

Curable compositions 2 to 26 of Examples 2 to 26 and curable compositions 1r to 13r of Comparative Examples 1 to 13 were prepared in the same manner as in Example 1, except that the components shown in Table 1 or 2 were used as the component (A), the component (B), and the component (C) in the ratio shown in Table 1 or 2.

In Comparative Examples 5 to 9, silane coupling agents (b1) to (b5) (i.e., a silane coupling agent that does not include a nitrogen atom and an epoxy group in the molecule) (component (b)) were respectively used instead of the component (B).

The details of the components (B2), (B3), and (b1) to (b5) shown in Tables 1 and 2 are as follows.

(B2): N,N'-bis[3-(trimethoxysilylpropyl)]urea (manufactured by AZmax Co.)
(B3): 2-(3,4-epoxycyclohexyl)ethyltrimethoxysilane ("KBM303" manufactured by Shin-Etsu Chemical Co., Ltd.)
(b1): tetrakis(2-methoxyethoxy)silane
(b2): 1,2-bis(triethoxysilyl)ethane
(b3): tetrapropoxysilane
(b4): tetrabuthyl orthosilicate
(b5): 1,2-bis(trimethoxysilyl)ethane

TABLE 1

| Component | Component (A) 100 parts | Component (B) or (b) Type | Amount (parts) | Component (C) Type | Amount (parts) |
|---|---|---|---|---|---|
| Example 1 | A1 | B1 | 10 | C1 | 0.1 |
| Example 2 | A1 | B1 | 10 | C1 | 1 |
| Example 3 | A1 | B1 | 10 | C1 | 3 |
| Example 4 | A1 | B1 | 10 | C1 | 5 |
| Example 5 | A1 | B1 | 10 | C1 | 10 |
| Example 6 | A1 | B1 | 15 | C1 | 1 |
| Example 7 | A1 | B1 | 15 | C1 | 3 |
| Example 8 | A1 | B1 | 15 | C1 | 5 |
| Example 9 | A2 | B1 | 10 | C1 | 1 |
| Example 10 | A2 | B1 | 10 | C1 | 5 |
| Example 11 | A1 | B2 | 5 | C1 | 1 |
| Example 12 | A1 | B2 | 5 | C1 | 5 |
| Example 13 | A1 | B3 | 10 | C1 | 1 |
| Example 14 | A1 | B3 | 10 | C1 | 5 |
| Example 15 | A1 | B1 + B3 | 10 + 10 | C1 | 2 |
| Example 16 | A1 | B1 + B3 | 5 + 5 | C1 | 1 |
| Comparative Example 1 | A1 | — | — | — | — |
| Comparative Example 2 | A3 | — | — | — | — |
| Comparative Example 3 | A4 | — | — | — | — |
| Comparative Example 4 | A1 | B3 | 10 | — | — |
| Comparative Example 5 | A1 | b1 | 10 | — | — |
| Comparative Example 6 | A1 | b2 | 10 | — | — |
| Comparative Example 7 | A1 | b3 | 10 | — | — |
| Comparative Example 8 | A1 | b4 | 10 | — | — |
| Comparative Example 9 | A1 | b5 | 10 | — | — |
| Comparative Example 10 | A1 | — | — | C1 | 5 |
| Comparative Example 11 | A1 | — | — | C1 | 10 |
| Comparative Example 12 | A1 | — | — | C1 | 15 |
| Comparative Example 13 | A1 | B1 | 0.1 | C1 | 1 |

TABLE 2

| Component | Component (A) 100 parts | Component (B) or (b) Type | Amount (parts) | Component (C) Type | Amount (parts) |
|---|---|---|---|---|---|
| Example 17 | A3 | B1 | 10 | C1 | 1 |
| Example 18 | A3 | B1 | 10 | C1 | 3 |
| Example 19 | A3 | B2 | 10 | C1 | 1 |
| Example 20 | A3 | B3 | 10 | C1 | 1 |
| Example 21 | A3 | B1 + B3 | 10 | C1 | 1 |
| Example 22 | A4 | B1 | 10 | C1 | 1 |
| Example 23 | A4 | B1 | 10 | C1 | 3 |
| Example 24 | A4 | B2 | 10 | C1 | 1 |
| Example 25 | A4 | B3 | 10 | C1 | 1 |
| Example 26 | A4 | B1 + B3 | 10 | C1 | 1 |

The initial transmittance, the transmittance after heating, the adhesion, and the crack occurrence ratio of the curable compositions 1 to 26 obtained in Examples 1 to 26 and the curable compositions 1r to 13r obtained in Comparative Examples 1 to 13 were measured as described below to determine the initial transparency and the heat resistance (transparency after heating), and evaluate the adhesive heat resistance and the crack resistance. The measurement results and the evaluation results are shown in Tables 3 and 4.

Measurement of Initial Transmittance

Each of the curable compositions 1 to 26 obtained in Examples 1 to 26 and the curable compositions 1r to 13r obtained in Comparative Examples 1 to 13 was poured into a mold to have a length of 25 mm, a width of 20 mm, and a thickness of 1 mm, and cured by heating at 140° C. for 6 hours to prepare a specimen. The initial transmittance (%) (wavelength: 400 nm and 450 nm) of the specimen was measured using a spectrophotometer ("MPC-3100" manufactured by Shimadzu Corporation).

Initial Transparency

A case where the initial transmittance at a wavelength of 400 nm was 80% or more was evaluated as "A", a case where the initial transmittance at a wavelength of 400 nm was 70% or more and less than 80% was evaluated as "B", and a case where the initial transmittance at a wavelength of 400 nm was less than 70% was evaluated as "C".

Measurement of Transmittance after Heating

The specimen for which the initial transmittance had been measured was allowed to stand in an oven at 150° C. for 500 hours, and the transmittance (%) (wavelength: 400 nm and 450 nm) of the specimen was measured. The transmittance thus measured was taken as the transmittance after heating.

Heat Resistance (Transparency after Heating)

A case where the transmittance (after heating) at a wavelength of 400 nm was 95% or more of the initial transmittance was evaluated as "A", a case where the transmittance (after heating) at a wavelength of 400 nm was 90% or more and less than 95% of the initial transmittance was evaluated as "B", a case where the transmittance (after heating) at a wavelength of 400 nm was 80% or more and less than 90% of the initial transmittance was evaluated as "C", and a case where the transmittance (after heating) at a wavelength of 400 nm was less than 80% of the initial transmittance was evaluated as "D".

Adhesion Test

Each of the curable compositions 1 to 26 obtained in Examples 1 to 26 and the curable compositions 1r to 13r obtained in Comparative Examples 1 to 13 was applied to a mirror surface of a silicon chip (2×2 mm) to a thickness of about 2 μm. The surface of the silicon chip to which the curable composition was applied was placed on an adherend (silver-plated copper sheet), and compression-bonded to the adherend. The curable composition was cured by heating at 170° C. for 2 hours to prepare a specimen-bonded adherend. After allowing the specimen-bonded adherend to stand for 30 seconds on a measurement stage of a bond tester ("Series 4000" manufactured by Dage Co., Ltd.) that had been heated to a given temperature (23° C. or 100° C.), adhesion (N/mm$^2$) (23° C. and 100° C.) between the specimen and the adherend was measured while applying stress (speed: 200 μm/s) to the bonding surface in the horizontal direction (shear direction) at a height of 50 μm above the adherend.

Adhesive Heat Resistance

A case where the adhesion at 23° C. and the adhesion at 100° C. measured by the adhesion test were 100 N/mm$^2$ or more was evaluated as "A", a case where the adhesion at 23° C. was 100 N/mm$^2$ or more, and the adhesion at 100° C. was less than 100 N/mm$^2$ was evaluated as "B", and a case where the adhesion at 23° C. was less than 100 N/mm$^2$ was evaluated as "C".

Crack Occurrence Ratio

Each of the curable compositions 1 to 26 obtained in Examples 1 to 26 and the curable compositions 1r to 13r obtained in Comparative Examples 1 to 13 was diluted with diethylene glycol monobutyl ether acetate so that the solid content in the curable composition was 80%. The composition was applied to a mirror surface of a silicon chip (2×2 mm) to a thickness of about 2 μm. The surface of the silicon chip to which the curable composition was applied was placed on an adherend (silver-plated copper sheet), and compression-bonded to the adherend. The curable composition was cured by heating at 170° C. for 2 hours to prepare a specimen-bonded adherend. The width of a resin (fillet) protruding from the silicon chip was measured using a digital microscope ("VHX-1000" manufactured by Keyence Corporation). A specimen-bonded adherend in which a fillet had a width of 80 to 120 nm and was formed along each side of the silicon chip was selected as an evaluation sample. The fillet of the evaluation sample was observed using an electron microscope (manufactured by Keyence Corporation) to determine whether or not cracks had occurred.

A case where the crack occurrence ratio was 0% or more and less than 25% was evaluated as "A", a case where the crack occurrence ratio was 25% or more and less than 50% was evaluated as "B", and a case where the crack occurrence ratio was 50% or more to 100% was evaluated as "C".

TABLE 3

| | Curable composition | Initial transmittance (%) | | Initial transparency | Transmittance after heating (%) | | Heat resistance (transparency after heating) | Adhesion (N/mm$^2$) | | Adhesive heat resistance | Crack resistance |
|---|---|---|---|---|---|---|---|---|---|---|---|
| | | 400 nm | 450 nm | | 400 nm | 450 nm | | 23° C. | 100° C. | | |
| Example 1 | 1 | 88.1 | 90.1 | A | 86.0 | 89.2 | A | 148.3 | 124.7 | A | A |
| Example 2 | 2 | 89.6 | 91.6 | A | 86.4 | 88.3 | A | 152.9 | 128.4 | A | A |
| Example 3 | 3 | 87.5 | 92.4 | A | 85.3 | 89.9 | A | 155.1 | 130.3 | A | A |
| Example 4 | 4 | 88.7 | 90.2 | A | 84.9 | 87.4 | A | 160.6 | 135.1 | A | A |
| Example 5 | 5 | 86.9 | 89.4 | A | 83.6 | 86.6 | A | 159.9 | 132.9 | A | A |
| Example 6 | 6 | 84.8 | 88.4 | A | 82.2 | 86.4 | A | 162.7 | 128.1 | A | A |
| Example 7 | 7 | 89.1 | 92.6 | A | 86.3 | 89.3 | A | 165.1 | 130.6 | A | A |
| Example 8 | 8 | 88.6 | 91.7 | A | 85.6 | 88.9 | A | 160.5 | 127.0 | A | A |
| Example 9 | 9 | 89.4 | 90.4 | A | 86.3 | 88.1 | A | 126.0 | 103.5 | A | A |
| Example 10 | 10 | 88.9 | 91.6 | A | 84.5 | 89.4 | A | 128.1 | 106.0 | A | A |
| Example 11 | 11 | 87.3 | 91.2 | A | 85.1 | 89.1 | A | 150.4 | 109.3 | A | B |
| Example 12 | 12 | 86.8 | 90.0 | A | 83.9 | 88.3 | A | 156.7 | 104.2 | A | B |
| Example 13 | 13 | 91.2 | 93.6 | A | 88.3 | 90.2 | A | 128.3 | 100.0 | A | A |
| Example 14 | 14 | 90.4 | 92.9 | A | 87.9 | 89.6 | A | 130.2 | 103.0 | A | A |

TABLE 3-continued

| | Curable composition | Initial transmittance (%) 400 nm | Initial transmittance (%) 450 nm | Initial transparency | Transmittance after heating (%) 400 nm | Transmittance after heating (%) 450 nm | Heat resistance (transparency after heating) | Adhesion (N/mm²) 23° C. | Adhesion (N/mm²) 100° C. | Adhesive heat resistance | Crack resistance |
|---|---|---|---|---|---|---|---|---|---|---|---|
| Example 15 | 15 | 90.3 | 93.4 | A | 88.4 | 91.1 | A | 144.8 | 119.6 | A | A |
| Example 16 | 16 | 88.9 | 91.9 | A | 86.7 | 90.5 | A | 151.4 | 120.0 | A | A |
| Comparative Example 1 | 1r | 90.5 | 93.3 | A | 89.8 | 90.6 | A | 31.8 | 9.0 | C | C |
| Comparative Example 2 | 2r | 91.3 | 93.0 | A | 90.0 | 91.7 | A | 26.5 | 6.1 | C | C |
| Comparative Example 3 | 3r | 91.8 | 92.2 | A | 89.2 | 90.8 | A | 25.3 | 5.2 | C | C |
| Comparative Example 4 | 4r | 90.1 | 90.7 | A | 84.1 | 88.4 | B | 122.1 | 93.7 | B | C |
| Comparative Example 5 | 5r | 89.2 | 90.3 | A | 85.1 | 86.7 | A | 120.2 | 86.0 | B | C |
| Comparative Example 6 | 6r | 91.9 | 93.4 | A | 88.9 | 90.1 | A | 90.2 | 66.4 | C | C |
| Comparative Example 7 | 7r | 91.6 | 92.5 | A | 88.4 | 91.2 | A | 104.8 | 84.3 | B | C |
| Comparative Example 8 | 8r | 90.7 | 93.1 | A | 89.2 | 90.6 | A | 87.9 | 60.2 | C | C |
| Comparative Example 9 | 9r | 78.6 | 84.4 | B | 80.3 | 82.4 | A | 84.1 | 63.3 | C | A |
| Comparative Example 10 | 10r | 88.3 | 92.6 | A | 85.3 | 90.2 | A | 131.5 | 89.7 | B | C |
| Comparative Example 11 | 11r | 87.9 | 92.2 | A | 86.1 | 91.1 | A | 143.5 | 94.0 | B | C |
| Comparative Example 12 | 12r | 88.4 | 91.4 | A | 86.6 | 89.9 | A | 148.0 | 102.7 | A | C |
| Comparative Example 13 | 13r | 88.5 | 92.1 | A | 85.8 | 90.6 | A | 40.2 | 15.9 | C | C |

TABLE 4

| | Curable composition | Initial transmittance (%) 400 nm | Initial transmittance (%) 450 nm | Initial transparency | Transmittance after heating (%) 400 nm | Transmittance after heating (%) 450 nm | Heat resistance (transparency after heating) | Adhesion (N/mm²) 23° C. | Adhesion (N/mm²) 100° C. | Adhesive heat resistance | Crack resistance |
|---|---|---|---|---|---|---|---|---|---|---|---|
| Example 17 | 17 | 89.6 | 92.3 | A | 88.7 | 90.4 | A | 130.6 | 115.4 | A | B |
| Example 18 | 18 | 90.4 | 91.7 | A | 91.1 | 92.2 | A | 142.0 | 124.9 | A | B |
| Example 19 | 19 | 88.1 | 90.5 | A | 86.4 | 88.4 | A | 124.9 | 112.6 | A | A |
| Example 20 | 20 | 89.7 | 91.3 | A | 87.2 | 89.4 | A | 135.4 | 121.7 | A | B |
| Example 21 | 21 | 88.6 | 90.7 | A | 86.6 | 88.7 | A | 130.7 | 114.1 | A | B |
| Example 22 | 22 | 87.2 | 90.7 | A | 88.9 | 91.6 | A | 132.4 | 112.3 | A | B |
| Example 23 | 23 | 88.3 | 90.4 | A | 89.2 | 91.1 | A | 139.2 | 122.7 | A | B |
| Example 24 | 24 | 88.2 | 91.2 | A | 86.4 | 91.4 | A | 127.7 | 124.7 | A | B |
| Example 25 | 25 | 87.1 | 89.4 | A | 85.2 | 88.6 | A | 136.8 | 119.4 | A | B |
| Example 26 | 26 | 87.9 | 90.1 | A | 85.7 | 87.9 | A | 132.2 | 116.9 | A | B |

As shown in Tables 3 and 4, the cured products of the curable compositions obtained in Examples 1 to 26 exhibited excellent initial transparency, excellent heat resistance (transparency after heating), excellent adhesion, excellent adhesive heat resistance, and excellent crack resistance.

On the other hand, the cured products of the curable compositions obtained in Comparative Examples 1 to 13 in which the component (B) or the component (C) was not used, or the amount of the component (B) was small, exhibited poor adhesion, poor adhesive heat resistance, and/or poor crack resistance although the initial transparency and the heat resistance (transparency after heating) were almost equal to (or lower to some extent than) those of the cured products of the curable compositions obtained in Examples 1 to 26.

The invention claimed is:

1. A curable composition comprising a component (A), a component (B), and a component (C), the curable composition comprising the component (A) and the component (B) in a mass ratio (component (A):component (B)) of 100:10 to 100:30, the component (A) being a silane compound copolymer (I) that is represented by a formula (a-1),

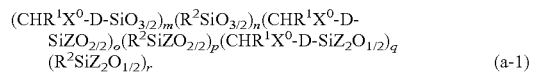

wherein $R^1$ is a hydrogen atom or an alkyl group having 1 to 6 carbon atoms, $X^0$ is a halogen atom, a cyano group, or a group represented by OG (wherein G is a protecting group for a hydroxyl group), D is a single bond or a substituted or unsubstituted divalent organic group having 1 to 20 carbon atoms, $R^2$ is an alkyl group having 1 to 20 carbon atoms, or a substituted or unsubstituted phenyl group, Z is a hydroxyl group, an alkoxy group having 1 to 10 carbon atoms, or a halogen atom, m and n are independently a positive integer, and o, p, q, and r are independently 0 or a positive integer, the component (B) being a 1,3,5-N-tris[(trialkoxysilyl) alkyl] isocyanurate represented by a formula (b-3), or an N,N'-bis[(trialkoxysilyl)alkyl]urea represented by a formula (b-4),

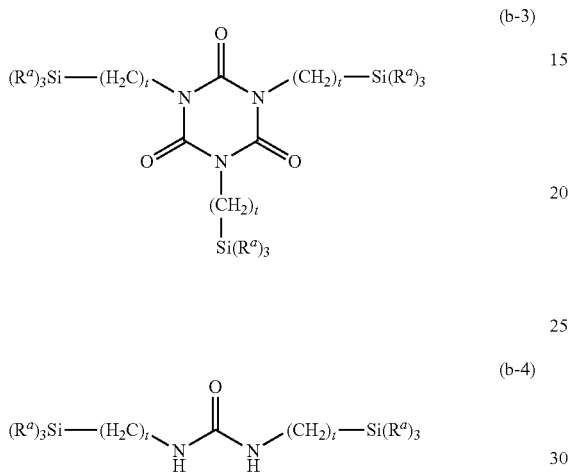
(b-3)

(b-4)

wherein $R^a$ are an alkoxy group having 1 to 6 carbon atoms, provided that $R^a$ are either identical or different, and t are independently an integer from 1 to 10, and the component (C) being a silane coupling agent that has an acid anhydride structure.

2. The curable composition according to claim 1, wherein the silane compound copolymer (I) used as the component (A) has a weight average molecular weight of 800 to 30,000.

3. The curable composition according to claim 1, wherein the silane compound copolymer (I) used as the component (A) is a compound represented by the formula (a-1) wherein m:n=5:95 to 60:40.

4. The curable composition according to claim 1, the curable composition comprising the component (A) and the component (C) in a mass ratio (component (A):component (C)) of 100:0.01 to 100:30.

5. A curable composition comprising a component (A'), a component (B), and a component (C), the curable composition comprising the component (A') and the component (B) in a mass ratio (component (A'):component (B)) of 100:10 to 100:30, the component (A') being a silane compound copolymer (II) that is produced by condensing a silane compound mixture that comprises at least one silane compound (1) represented by a formula (1) and at least one silane compound (2) represented by a formula (2), $$R^1\text{—CH}(X^0)\text{-D-Si}(OR^3)_u(X^1)_{3-u} \quad (1)$$

wherein $R^1$ is a hydrogen atom or an alkyl group having 1 to 6 carbon atoms, $X^0$ is a halogen atom, a cyano group, or a group represented by OG (wherein G is a protecting group for a hydroxyl group), D is a single bond or a substituted or unsubstituted divalent organic group having 1 to 20 carbon atoms, $R^3$ is an alkyl group having 1 to 10 carbon atoms, $X^1$ is a halogen atom, and u is an integer from 0 to 3, $$R^2Si(OR^4)_v(X^2)_{3-v} \quad (2)$$

wherein $R^2$ is an alkyl group having 1 to 20 carbon atoms, or a substituted or unsubstituted phenyl group, $R^4$ is an alkyl group having 1 to 10 carbon atoms, $X^2$ is a halogen atom, and v is an integer from 0 to 3, the component (B) being a 1,3,5-N-tris[(trialkoxysilyl) alkyl] isocyanurate represented by a formula (b-3), or an N,N'-bis[(trialkoxysilyl)alkyl]urea represented by a formula (b-4),

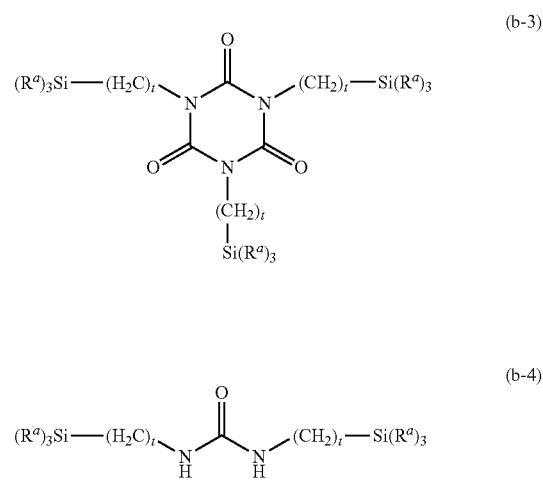
(b-3)

(b-4)

wherein $R^a$ are an alkoxy group having 1 to 6 carbon atoms, provided that $R^a$ are either identical or different, and t are independently an integer from 1 to 10, and the component (C) being a silane coupling agent that has an acid anhydride structure.

6. The curable composition according to claim 5, wherein the silane compound copolymer (II) used as the component (A') has a weight average molecular weight of 800 to 30,000.

7. The curable composition according to claim 5, the curable composition comprising the component (A') and the component (C) in a mass ratio (component (A'):component (C)) of 100:0.01 to 100:30.

8. The curable composition according to claim 1, wherein the component (C) is a 3-(trialkoxysilyl)propylsuccinic anhydride.

9. The curable composition according to claim 1, the curable composition being an optical device-securing composition.

10. A cured product obtained by curing the curable composition according to claim 1.

11. The cured product according to claim 10, the cured product being an optical device-securing material.

12. A method for using the curable composition according to claim 1 as an optical device-securing adhesive.

13. A method for using the curable composition according to claim 1 as an optical device sealing material.

14. A sealed optical device comprising an optical device and a cured product of the curable composition according to claim 1, the optical device being sealed with the cured product.

15. A method for producing a sealed optical device comprising forming the curable composition according to claim 1 to have a desired shape so as to enclose an optical device to obtain a formed article that includes the optical device, and curing the curable composition by heating.

16. The curable composition according to claim 5, wherein the component (C) is a 3-(trialkoxysilyl)propylsuccinic anhydride.

17. The curable composition according to claim 5, the curable composition being an optical device-securing composition.

18. A cured product obtained by curing the curable composition according to claim 5.

19. A method for using the curable composition according to claim 5 as an optical device-securing adhesive.

20. A method for using the curable composition according to claim 5 as an optical device sealing material.

21. A sealed optical device comprising an optical device and a cured product of the curable composition according to claim 5, the optical device being sealed with the cured product.

22. A method for producing a sealed optical device comprising forming the curable composition according to claim 5 to have a desired shape so as to enclose an optical device to obtain a formed article that includes the optical device, and curing the curable composition by heating.

* * * * *